United States Patent [19]

Lockett

[11] 4,260,062

[45] Apr. 7, 1981

[54] FOREIGN OBJECT DISCRIMINATOR FOR SORTING APPARATUS

[75] Inventor: James F. Lockett, Houston, Tex.

[73] Assignee: Geosource Inc., Houston, Tex.

[21] Appl. No.: 829,485

[22] Filed: Aug. 31, 1977

[51] Int. Cl.³ .......... B07C 5/342; G01J 3/46

[52] U.S. Cl. .......... 209/582; 209/587; 250/223 R; 356/425

[58] Field of Search .......... 209/111.5, 111.6, 111.7 R, 209/111.7 T, 74 R, 74 M, 73, 75, 580, 581, 582, 587; 250/562, 563, 560, 223 R; 356/195, 179, 178, 407, 408, 425

[56] References Cited

U.S. PATENT DOCUMENTS

| | | | |
|---|---|---|---|
| 3,257,897 | 6/1966 | Schneider | 209/111.6 X |
| 3,729,635 | 4/1973 | Shottenfield et al. | 250/562 |
| 3,867,039 | 2/1975 | Nelson | 209/111.6 X |
| 3,980,181 | 9/1976 | Hoover et al. | 356/179 X |
| 4,011,457 | 3/1977 | Wolf | 250/563 |

*Primary Examiner*—Robert J. Spar

*Assistant Examiner*—Edward M. Wacyra

*Attorney, Agent, or Firm*—Arnold, White & Durkee

[57] ABSTRACT

A sorting apparatus for sorting articles randomly disposed in an article stream includes a viewer for viewing a predetermined area through which the article stream is passed and for generating an electrical characteristic signal functionally related to the presence of a physical characteristic of the article passing within the viewed area. The electrical characteristic signal is compared to a range of signal values representative of a foreign object. The amount of time during which the characteristic signal falls within the range of signal values during a reference time interval is measured and compared with a time reference standard. An article reject signal is generated if the characteristic signal falls within the predetermined range of signal values for an amount of time exceeding the predetermined time reference standard. The reference time interval is measured from the occurrence of an article-detect signal generated by an article-detect signal generator which signal is representative of the presence of an article within the viewed area. The invention may be implemented in digital or analog format and in a multiplexed or non-multiplexed environment.

6 Claims, 10 Drawing Figures

FIG. B
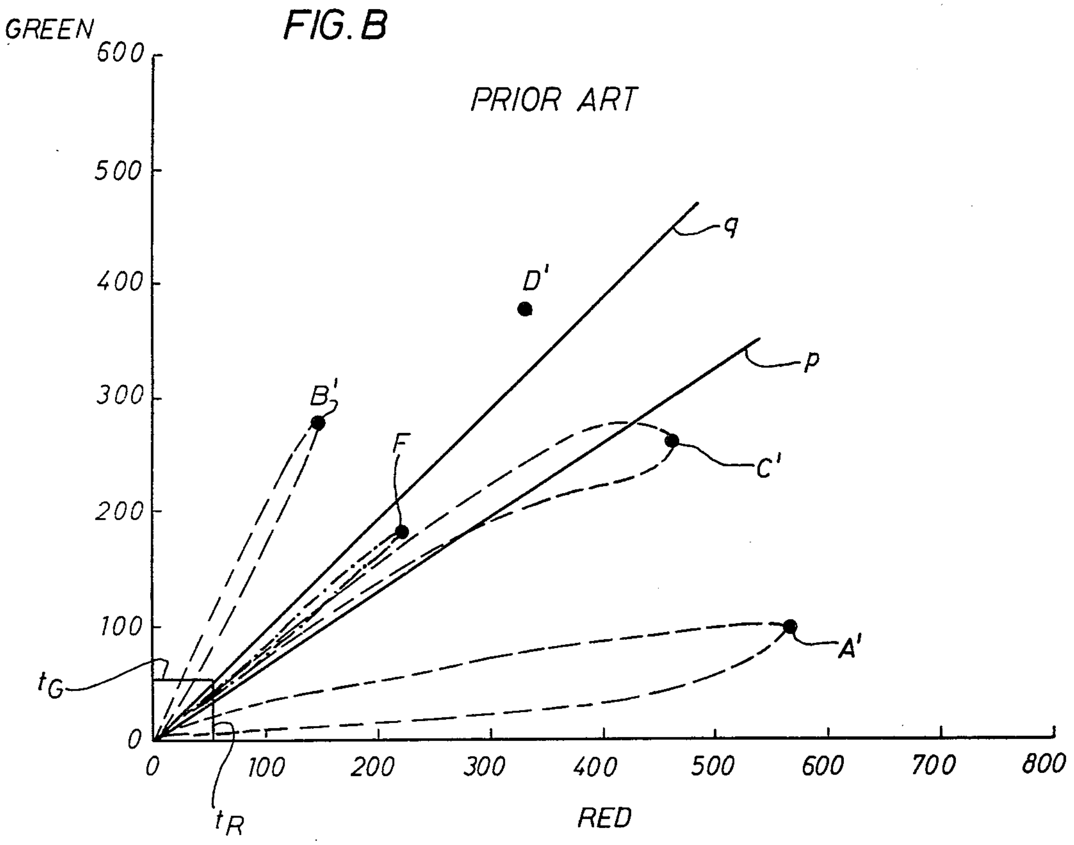
FIG. 1
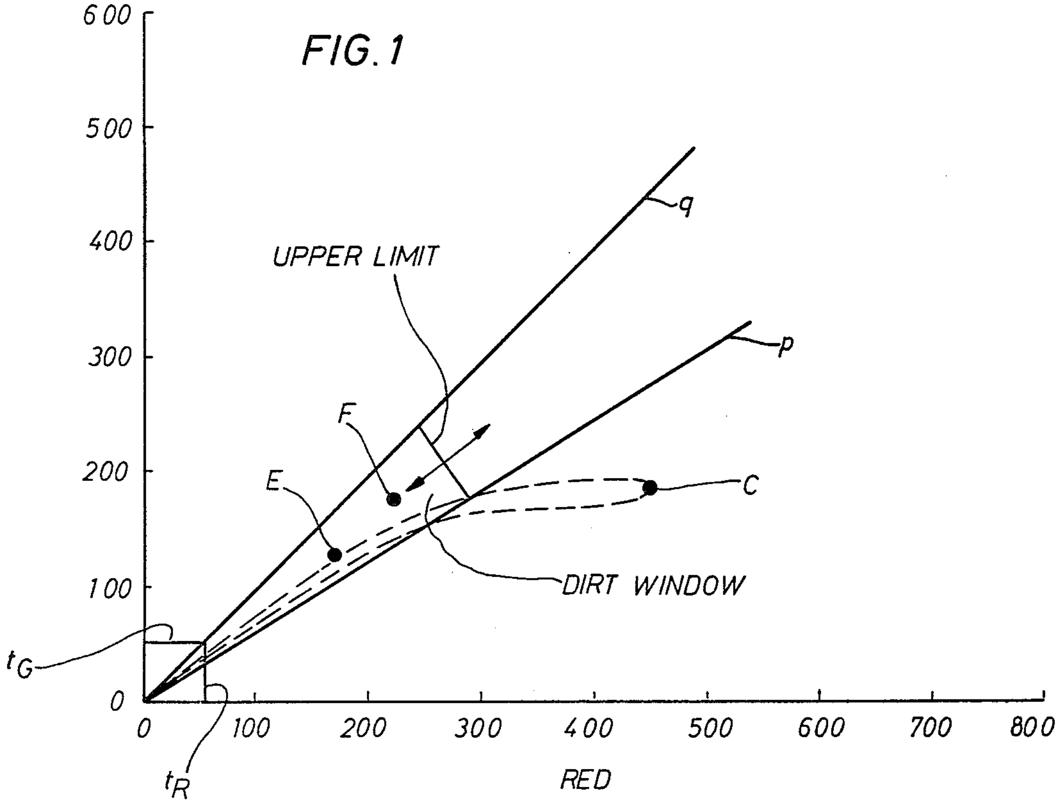

PRIOR ART
FIG. A
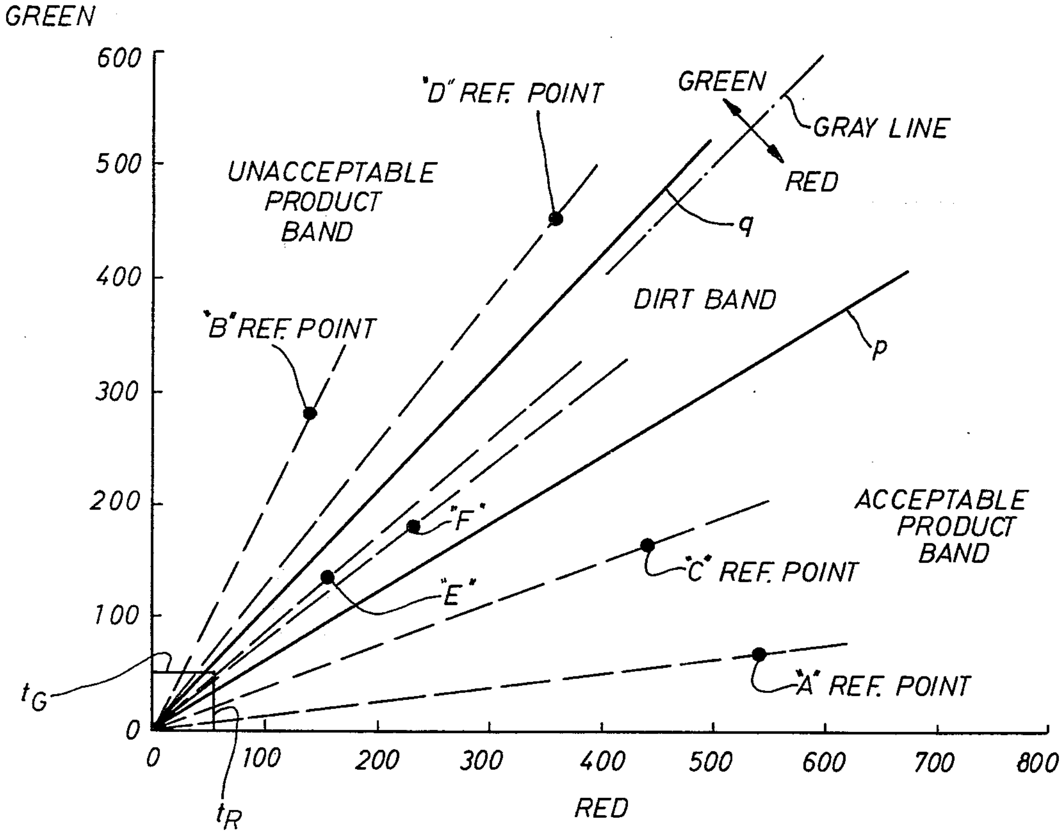

FOREIGN OBJECT DISCRIMINATOR FOR SORTING APPARATUS

BACKGROUND OF THE INVENTION

1. Field of the Invention

This invention relates to apparatus for sorting randomly disposed articles in an article stream, and in particular, to a sorting apparatus wherein foreign objects, as dirt clods, are distinguished from marginally acceptable comestible products on the basis of the amount of time that an electrical signal representative of a physical characteristic of an article falls within a predetermined range of values.

2. Description of the Prior Art

The economic utility of in-field separation of acceptable from unacceptable harvested comestibles, such as tomatoes, is readily apparent. Not only does such in-field sorting significantly reduce labor costs, but it also shortens the transport time from farm to cannery or market, thus reducing waste due to spoilage.

Various types of sorting apparatus are known in the art. Several prior patents directed to sorting apparatus are listed in the background portion of the co-pending application of John D. P. Jones, Miles A. Smither and Elias H. Codding, Ser. No. 704,651, filed July 12, 1976, now U.S. Pat. No. 4,134,498, assigned to the assignee of the present invention. One general classification of sorting apparatus, known as a bichromatic sorting apparatus, utilizes light energy reflected from articles to be sorted at two predetermined wavelengths. For a bichromatic tomato sorter, these wavelengths typically fall at 550 nanometers (green light) and 660 nanometers (red light). Electrical characteristic signals, each corresponding in magnitude to the intensity of light reflected from the article at each respective wavelength, are typically utilized to generate a ratio classification signal which is then compared to a predetermined reference signal value. The article sort, when based upon color criteria, is effected when the classification signal exceeds (for example) the reference signal value.

Bichromatic sorting apparatus may utilize the article conveyor as the reference background intensity standard against which the intensities of reflected light signals are compared. U.S. Pat. No. 3,980,181 issued to Michael C. Hoover and Elias H. Codding and assigned to the assignee of the present invention exemplifies such an approach. The conveyor background may, during harvesting, change in color due to the settling of dust or dirt thereon. Thus, the reference standard against which light reflected from articles being sorted is compared may drift and change over time. Gain range amplifiers or the like may, however, be utilized to obviate this difficulty. Sorting apparatus such as that disclosed and claimed in the co-pending application of James F. Lockett, Ser. No. 704,697, filed July 12, 1976, and assigned to the assignee of the present invention utilize a non-reflective background against which light at the predetermined wavelengths reflected from the articles to be sorted is detected. This non-reflective background, or "black hole", is not altered by the deposition of dust, dirt or sediment found during harvesting and is believed advantageous for this reason.

Regardless of the background utilized, advances in prior sorting apparatus included the use of multiplexed sorting arrangements whereby signal outputs from a plurality of light sensing viewers arranged across a random article stream are sampled on a time-shared basis and sequentially applied to a classification and comparison network. The results of the classification and comparison (either a product-accept or a product-reject signal) are stored in predetermined locations in a random access memory for a predetermined time delay sufficient to permit the classified article to fall from the proximity of the viewed area to the proximity of an ejector element. At the expiration of the delay the memory storage location is addressed and the result of the classification and comparison (if a reject signal) is applied through a demultiplexer arrangement to activate the appropriate product ejector to thereby separate the rejected article from the article stream. The referenced U.S. Pat. No. 4,134,498 discloses and claims a sorting apparatus of this type. As a variation on the basic multiplexed sorter exemplified by this patent, a multiplexed sorting apparatus having an in-use testing capability to verify the operability of circuit components by testing signal outputs at selected test points in the multiplexed sorter circuitry at preselected channel times is disclosed and claimed in the co-pending application of James E. Lockett, Ser. No. 704,652, filed July 12, 1976, now U.S. Pat. No. 4,088,227 also assigned to the assignee of the present invention. A power supply arrangement for a multiplexed sorting apparatus using the switching of capacitor elements is disclosed and claimed in the co-pending application of James F. Lockett, Ser. No. 704,697, filed July 12, 1976 and assigned to the assignee of the present invention.

The basic principle underlying the operation of any of the above-mentioned sorting apparatus (whether bichromatic or not) is that certain "acceptable" articles reflect a greater intensity of light at a given wavelength than is reflected by other articles, whether they are "marginally acceptable" or "rejectable". For example, in the bichromatic sorting apparatus, an article is "acceptable" if it reflects a greater intensity of light at one of the selected wavelengths than at the other selected wavelength such that the ratio signal produced by an "acceptable" article is greater than the ratio signal produced by other articles. Accordingly, a comparison of the ratio of electrical signals representative of reflected light intesities may be used to classify the "acceptable" from the "unacceptable" articles.

This principle is aptly illustrated in the case of a bichromatic tomato sorting apparatus graphically depicted on FIG. A. It is believed instructive to examine FIG. A, in which the electrical signal magnitude (in millivolts) representative of the intensity of light reflected from an article being sorted at the red wavelength (660 nanometers) is indicated along the abscissa and the electrical signal magnitude representative of light from an article being sorted at the green wavelength (550 nanometers) is indicated along the ordinate. A totally acceptable ripe tomato (reference point A) has a greater "red" signal magnitude (approximately 530 millivolts) than a "green" signal magnitude (approximately 65 millivolts). Conversely, an unacceptable unripe tomato (reference point B) has a "red" signal magnitude of approximately 125 millivolts and a "green" signal magnitude approximately equal to 300 millivolts. In the case of a bichromatic tomato sorting apparatus then, the ripe tomato yields a relatively high ratio of "acceptable" to "unacceptable" signals. (The ratio of the reflected signals is not illustrated in FIG. A). The converse, of course, is true for the unripe tomato, thereby establishing a fairly straightforward basis for a comestible article sort.

Tomatoes that are less than fully ripe (a "marginally acceptable" tomato as at reference point C) and a less than fully unripe tomato (as at reference point D) are readily observed to be closer to a "gray line" extending approximately 45 degrees from the origin of FIG. A. Tomatoes that are less than fully ripe, as illustrated at point C, are known in the art as "pink" or "breaker" tomatoes. These breaker tomatoes are marginally acceptable in that they may, with further ripening, provide an edible product. Unripe tomatoes, as at point D, are unacceptable.

However, these thus-far defined reference points on FIG. A are only part of the overall picture. No in-field sorting apparatus will recover from the field only comestible articles, that is, only ripe, "breaker" or unripe tomatoes. Practicality requires that these sorting apparatus also correctly take into account and reject foreign objects such as dirt clods, pieces of wood, rocks or the like which are invariably "harvested" together with the comestible products. Therefore, the underlying theory based on the reflectivity characteristics of articles to be sorted must be broad enough to accommodate the reflectivity patterns for these foreign objects which are randomly carried in the article stream being sorted. It has been observed, as illustrated on FIG. A at reference points E and F, that dirt clods, rocks and other foreign objects typically exhibit reflected light intensities which congregate just to the red side of the gray line. The outer limit intensity for foreign objects is illustrated at approximately point F. Experience has indicated that foreign objects typically reflect light intensities which define reference points which lie within a "dirt band" region between divergent straight lines p and q. An "acceptable product" band may then be seen to exist between the line p and the abscissa, while an "unacceptable product" band may be seen to exist between the line q and the ordinate. Some threshold intensities (illustrated as the lines $t_R$ and $t_G$) eliminate extraneous noise signals from triggering a sort and are superimposed on FIG. A for this reason.

The facts graphically illustrated in FIG. A are generated by measuring the reflectivity characteristics of a stationary article. As such, FIG. A may be viewed as defining the "static" case. Not unexpectedly, in actual in-field use, some deviations from the "static" case illustrated in FIG. A have been observed. These deviations may be attributed to "dynamic" conditions inherent in an in-field environment. Thus, as shown in FIG. B, to comport with the realities and practicalities of in-field sorting, a time element must be superimposed onto the "static" findings depicted in FIG. A. Therefore, in FIG. B, the actual situation observed as a particular article progressively comes within the area viewed by a given viewer element is shown. As seen, the signal intensities representative of light at each of the bichromatic wavelengths reflected from the article varies as a function of time. Such variances are depicted in FIG. B as signal trace paths. In the case of the red and green tomatoes (reference points A′ and B′, respectively) FIG. B illustrates the trace paths corresponding to each article. It is noted that these trace paths shown on FIG. B ultimately lead to the signal values corresponding to the static reference points A and B which are shown in FIG. A. It is observed that the trace paths of ripe and unripe tomatoes fall entirely within the "acceptable product" band and the "unacceptable product" band, respectively.

However, the trace path associated with the breaker tomato leading to and trailing from reference point C′ (corresponding to reference point C on FIG. A) passes through the "dirt band". Thus, to prior art sorting apparatus, a marginably acceptable comestible product, as a breaker tomato, is classified as a foreign object and rejected since sorting apparatus of the prior art generate a product reject signal if a classification signal falls within the "dirt band". This, of course, is economically disadvantageous since breaker tomatoes are marginally acceptable and, with further ripening, become completely acceptable.

Accordingly, it would be of advantage to avoid economic waste due to the rejection of breaker tomatoes. Furthermore, it would be of advantage to provide an in-field sorting apparatus able to accurately differentiate between foreign objects, such as dirt clods and rocks and the like, and breaker tomatoes on the basis of the time duration of the trace paths within the "dirt band".

SUMMARY OF THE INVENTION

This invention relates to a sorting apparatus for sorting articles disposed randomly across an article stream. The sorting apparatus includes viewer means for viewing a predetermined area through which the article stream is passed and for generating an electrical characteristic signal functionally related to the presence of a predetermined physical characteristic (as the color reflectivity) of an article passing within the viewed area. The sorting apparatus includes classification means for classifying the article on the basis of a comparison between the magnitude of the characteristic signal and a predetermined range of signal values representative of a foreign object. A foreign object discriminator in accordance with the invention comprises timing means for measuring the amount of time, during a reference time interval, that the electrical characteristic signal falls within the predetermined range of signal values representative of a foreign object. An electrical article-reject signal is generated if the amount of time that the electrical characteristic signal falls within the predetermined range of signal values exceeds a predetermined time reference criteria. Means for generating an electrical article-detect signal representative of the presence of an article within the area viewed by the viewer means is operatively associated with the timing means such that the reference time interval is measured from the occurrence of the electrical article-detect signal.

The invention may be implemented digitally by the provision of means for polling the classification and comparison means a predetermined number of discrete occasions N within the predetermined reference time interval. Counter means operatively associated with the polling means are incremented for each instance out of the N discrete occasions that the characteristic signal falls within the range of signal values and an article-detect signal is contemporaneously present. The counter is periodically compared (typically in each instance) with a predetermined count and an electrical article reject signal generated if the counter exceeds the predetermined count. Of course, the reject signal may be either emitted from the reject signal generating means, or, alternatively, a signal elsewhere generated (as by the classification and comparison means) may be inhibited from being asserted by action of the reject signal generating means. Both alternatives are within the contemplation of the invention. Sorting apparatus embodying the invention may be implemented in analog form, if desired, and may also be used in an arrangement wherein classification and comparison circuitry is provided in association with each viewer in an array of M viewers. On the other hand, the invention is equally applicable in a multiplexed sorting apparatus wherein M viewers are sequentially sampled and characteristic signals generated therefrom classified and compared by common circuitry. In a digital implementation of a multiplexed sorting apparatus, N consecutive channel times during which each one of the M viewers is sampled may conveniently correspond to the discrete occasions in which the classification and comparison means is polled, with the first of the N consecutive channel times (and the start of the reference time interval) being determined by the generation of an article-detect signal representative of the appearance of an article within the viewed area corresponding to the viewer whose characteristic is being sampled.

The implementation of the invention in either digital or analog form is equally applicable to monochromatic or bichromatic sorting apparatus. The invention may be practiced in the context of a multiplexed or non-multiplexed sorting apparatus.

BRIEF DESCRIPTION OF THE DRAWINGS

The invention will be more fully understood from a following description thereof, taken in connection with the accompanying drawings, which form a part of this specification, and in which:

FIGS. A and B are signal intensity diagrams illustrating the static and dynamic response, respectively, of sorting apparatus of the prior art;

FIG. 1 is a signal intensity diagram of a sorting apparatus embodying the teachings of the present invention;

DESCRIPTION OF THE PREFERRED EMBODIMENT

Figure 2:
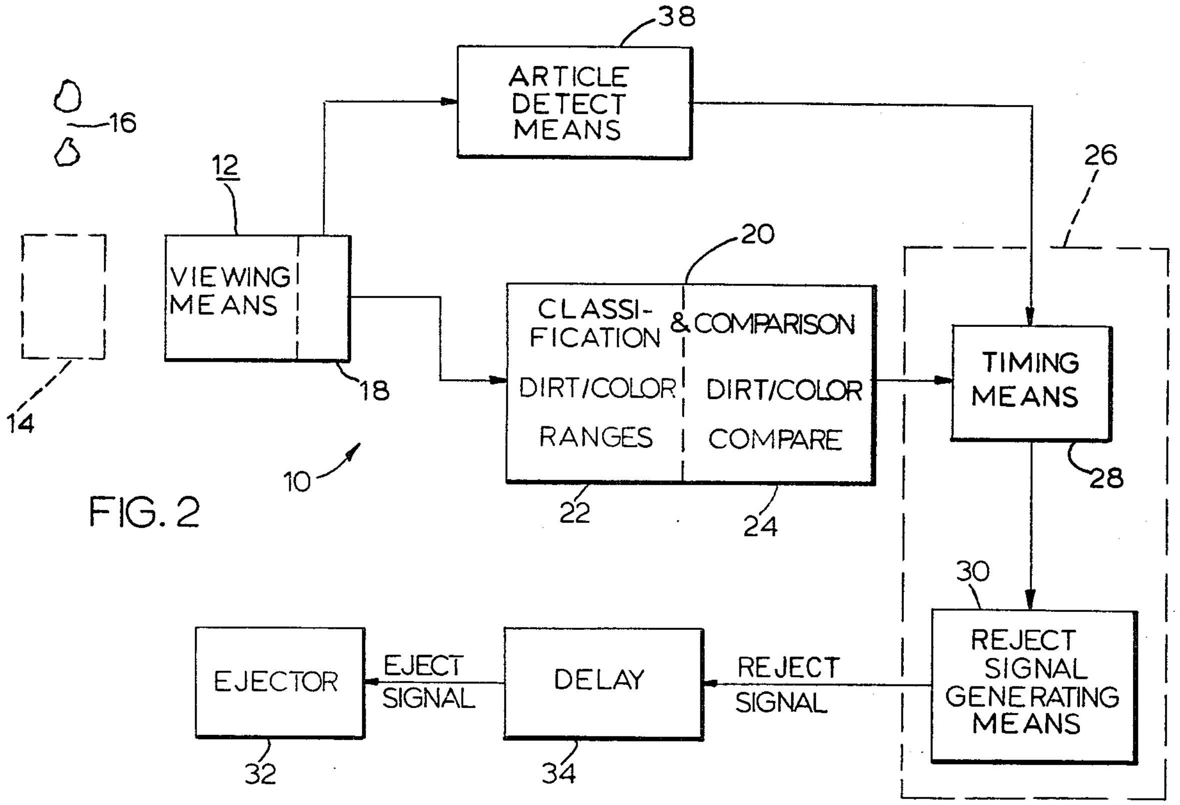
FIG. 2 is a generalized block diagram of a sorting apparatus embodying the teachings of this invention.

Throughout the following description, similar reference numerals refer to the similar elements in all figures of the drawings.

With reference to FIG. 1 a signal intensity diagram similar to those shown in FIGS. A and B (both prior art) illustrates the principle underlying the invention.

In FIG. 1, (similar to the cases in FIGS. A and B), the magnitude (in millivolts) of an electrical signal representative of the intensity of light reflected from an article passing within the viewed area of a viewer element at the red wavelength of 660 nanometers is charted along the abscissa. The ordinate illustrates the electrical signal magnitude (in millivolts) representative of the intensity of light reflected from an article passing within the viewed area at the green wavelength of 530 nanometers. As discussed above, empirical observation has shown that breaker tomatoes, which have a static reflectivity corresponding to the coordinate of point C (FIG. A), have, in a dynamic condition, a trace path (FIG. B) which passes through the dirt band defined between the lines p and q. It has been observed that foreign objects, such as dirt clods and the like, tend to exhibit reflected light intensities such that the trace of the electrical signals representative thereof congregate in the dirt band and never leave the boundaries defined by the lines p and q. Furthermore, it has also been observed that the signal amplitudes representative of a foreign object reach a ceiling in the vicinity of point F.

In accordance with this invention and with reference to FIG. 1, if a portion of the dirt band is enclosed by an adjustable upper limit (the lower limit being defined by the threshold levels $t_R$ and $t_G$), a predetermined, enclosed "dirt window" is defined. From FIG. 1, it may be observed that the dynamic tract paths (identical to those shown in FIG. B) of signal intensities corresponding to light reflected from foreign objects remain entirely within the dirt window. On the other hand, dynamic signal trace paths (identical to those shown in FIG. B) representative of the reflected signal intensities of breaker tomatoes pass through the dirt window only during a portion of the trace path. Moreover, the remaining portion of the breaker tomato trace path extends beyond the confines of the dirt window as it progresses from origin (conveniently a "black hole" value), above the threshold limits $t_R$ and $t_G$ and through the dirt window, thence on past the upper limit intensity to the reference point C and back to origin. It may be readily observed that only a portion of the trace path associated with the breaker tomato is within the dirt window. It therefore follows that only a portion of the time that a breaker tomato is viewed will the characteristic signal representative of a physical characteristic thereof (i.e., its dirt content) fall within a range of electrical signals representative of the dirt window.

Accordingly, it has been recognized that if a set of signal values corresponding to the dirt window is defined, and if a comparison of the amount of time during which a characteristic signal from a breaker tomato falls within the dirt window is made against a predetermined time reference criteria, accurate identification of the article as either a breaker tomato or a foreign object is possible. This time-comparison principle is applicable to sorting apparatus using either a monochromatic or a bichromatic color standard and regardless of whether the apparatus is multiplexed or not.

With reference to FIG. 2 the generalized block diagram of a sorting apparatus embodying the teachings of this invention is illustrated. It is understood that the sorting apparatus 10 may either be a monchromatic or bichromatic sorting apparatus and may either be multiplexed or non-multiplexed in internal operation and yet remain within the contemplation of this invention. The sorting apparatus 10 includes means 12 for viewing a predetermined area 14 through which a stream 16 of randomly disposed articles to be sorted may be passed. It is, of course, appreciated that the predetermined viewed area 14 illustrated in FIG. 2 may be any convenient location on the article conveyance path. For example, the area 14 may be defined on an article conveyor or a portion of a free fall path between an upper and a lower conveyor element. Background intensity reference may be either the conveyor itself or the "black hole" reference.

A portion of the viewer means 12 comprises means 18 for generating an electrical characteristic signal functionally related to the presence of a predetermined physical characteristic in an article passing within the viewed area 14. The electrical characteristic signal output is applied to classification and comparison means 20. The means 20 includes an arrangement 22 for electronically defining a range of signal values corresponding to the dirt window and to acceptable color and an arrangement 24 for comparing the magnitude of the classification signal with the predetermined signal values. Of course, in this discussion, primary emphasis is placed upon the generation of a range of signal values representative of the dirt window (FIG. 1) and a comparison of the electrical characteristic signal with the dirt window range.

In accordance with the invention, a foreign object discriminator 26 is provided in association with the classification and comparison means 20. The discriminator 26 includes timing means 28 operatively associated with the classification and comparison means 20 for measuring the amount of time during a predetermined reference time interval that the characteristic signal falls within the predetermined range of signal values corresponding to a foreign object (i.e., falls within the range of signals representative of the dirt window). Reject signal generating means 30 is responsively associated with the timing means 28 for generating an electrical reject signal if the amount of time that the characteristic signal falls within the predetermined range of values exceeds a predetermined time reference criteria. The reject signal generating means 30 is operatively connected with an ejector element 32 which is operable to eject a foreign object from the article stream. A time delay 34 (in the form of a storage element as a memory or register) may be provided to delay the actuation of the ejector element 32 until the article passes from proximity of the viewed area 14 to proximity of the ejector element 32 by storing the reject signal from the means 30 for an appropriate time delay before the stored signal (now termed an "eject" signal) actuates the ejector 32. It is within the contemplation of this invention to utilize the means 30 as an inhibitor in the sense that a reject signal developed elsewhere (perhaps generated by the classification and comparison means 20) may be inhibited from actuating the ejector element 32.

Article-detect means 38 is associated with the viewer means 12 and the timing means 28. The article-detect means 38 generates an electrical article-detect signal when an article is within the area 14 viewed by the viewer means 12. The presence of an electrical article-detect signal serves to start the reference time interval during which the amount of the time residency of the characteristic signal within the dirt window is measured.

Figure 3:
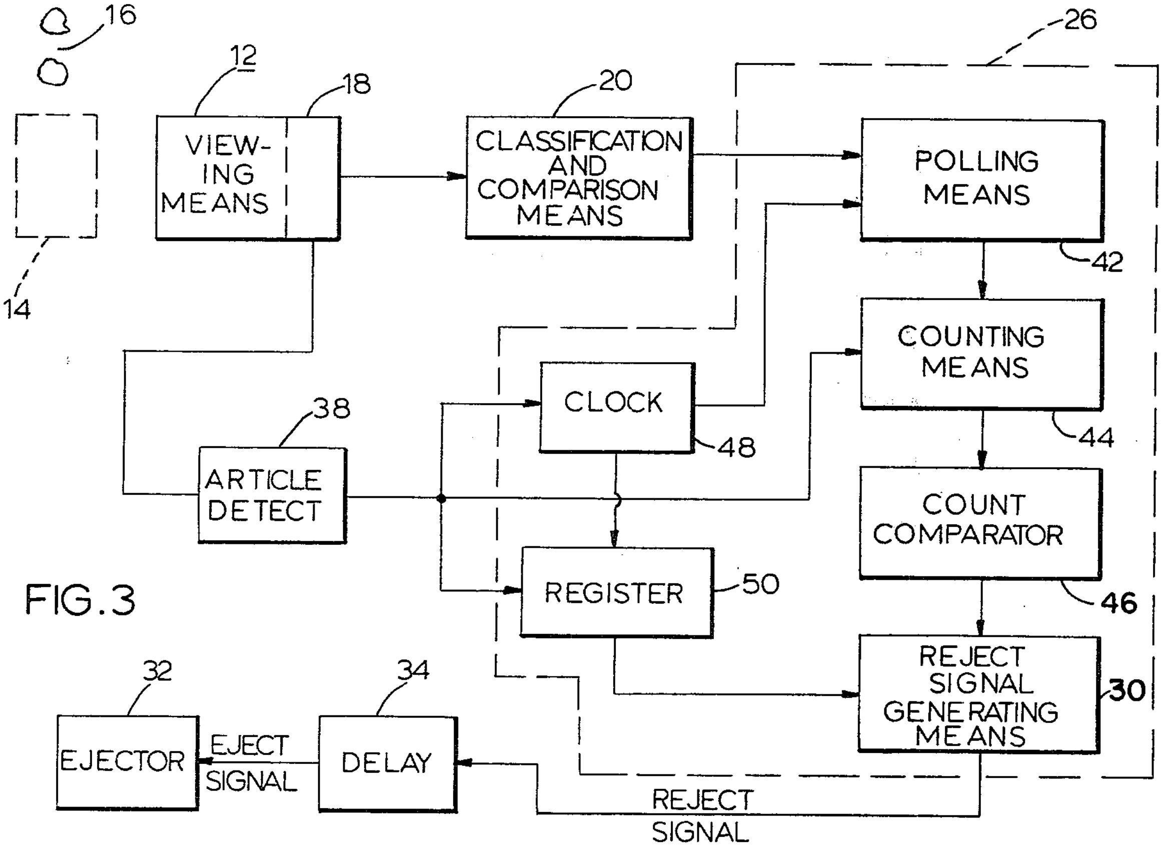
FIG. 3 is a generalized block diagram of a sorting apparatus wherein the invention is digitally implemented.

It is, of course, understood that the implementation of the functional arrangement illustrated in connection with FIG. 2 may be provided in either an analog or a digital format. However, since digital circuitry has the advantage (among others) of being applicable to rugged in-field sorting environments, a digital implementation is favored. FIG. 3 illustrates a generalized schematic diagram of a digitally implemented embodiment of a sorting apparatus utilizing the teachings of this invention.

With reference to FIG. 3 a generalized block diagram of a digital implementatiion of a sorting apparatus 10 embodying the teachings of this invention is illustrated. Generally speaking, digitally measuring the amount of time that an event occurs (as the amount of time that a signal lies in a range) may be accomplished by segmenting a given reference time interval into a predetermined number of N discrete occasions or sub-intervals, polling in each sub-interval for the occurrence of the event or activity being time-measured, and incrementing a counter for each sub-interval in which the event or activity has occurred. This count may be compared with a reference criteria, as a predetermined reference count. A timing signal representative of the start of the reference time interval is loaded into a storage device, as a register, during the first sub-interval. The polling and counting activity is thereafter continued in each sub-interval until the timing signal is output from the storage device after a storage period equal to the reference time interval. At the end of the reference time interval (the reappearance of the timing signal) an output signal may be generated which represents the result of a comparison of the count with a preset reference count.

Therefore, in the generalized digital embodiment of the invention shown in FIG. 3, the foreign object discriminator 26 includes means 42 operatively associated with the classification and comparison means 20 for polling the classification and comparison means 20 a predetermined number of discrete occasions N within a predetermined reference time interval. Counting means 44 is associated with the polling means 42 for counting the number of instances out of the N discrete occasions that the characteristic signal from the viewer means 12 falls within the predetermined range of signal values representive of a foreign object. The counting means 44 is connected with the polling means 42 and the article-detect means 38 such that the counting means 44 may be incremented only if, during a given discrete occasion, the characteristic signal falls within the range of signal values representative of a foreign object and, during the same discrete occasion, the article-detect means 38 generates an article-detect signal. The discriminator 26 further includes a count comparator 46 which, during each discrete occasion, compares the current count registered in the counting means 44 with a predetermined count. At the end of the reference time interval if the current count has exceeded the predetermined count, the output of the count comparator is applied to the reject signal generating means 30.

Any suitable arrangement may be used to enable the means 42 to perform the polling function during each of the N discrete occasions. For example, a clock 48 may be connected to the output of the article-detect means 38 and responsive to an article-detect signal to thereby enable the polling means 42 during each of the N discrete occasions. The generation of the article-detect signal provides a suitable timing signal which may be loaded into a storage device or register 50 during the first occasion and stored there for a period equal to the reference time interval. At the end of the reference time interval, the timing signal is output from the register 50 and enables the reject signal generating means 30. If, therefore, when the timing signal is output from the register 50, the count comparator 46 indicates that a current count exceeds or equals a preset reference count, an article-reject signal is generated from the means 30. The reject signal is applied to the delay 34 and delayed for a period of time before being applied to the ejector element 32.

It may be appreciated that the digital implementation of the foreign object discriminator 26 shown in FIG. 3 performs the timing function described generally in connection with FIG. 2 by segmenting a reference time interval into N discrete occasions. By counting the number of instances out of the N discrete occasions that a characteristic signal falls within the range of signal values representative of the dirt window an indication of the duration of the time residency of the characteristic signal within the dirt window may be gained. The reference time interval is initiated by the occurrence of an article-detect signal from the article-detect means 38 representative of the initial appearance of an article in the article stream 16 within the area 14 viewed by the viewer means 12.

Figure 4:
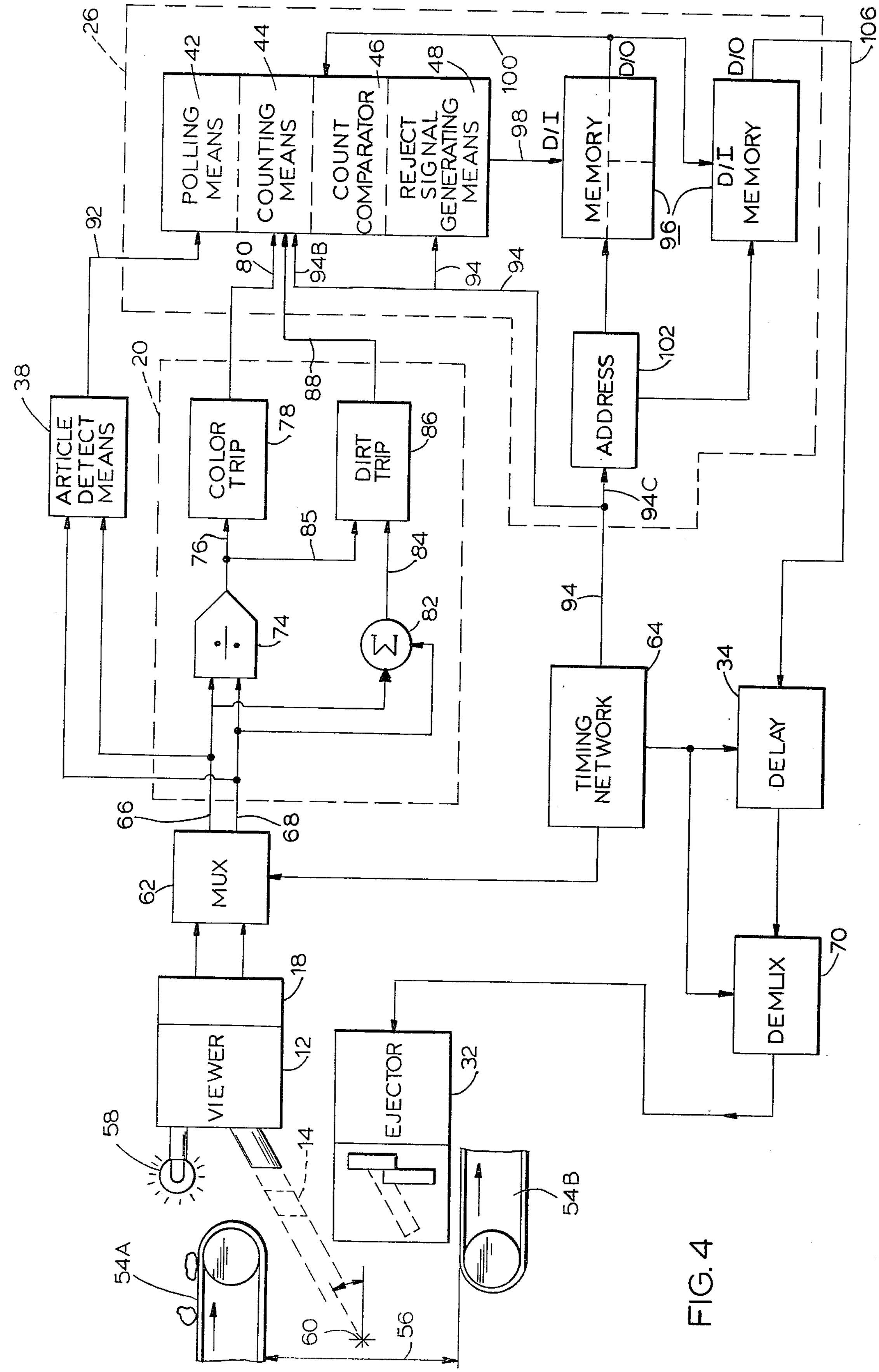
FIG. 4 is a generalized block diagram of a sorting apparatus embodying the teachings of this invention digitally implemented in a multiplexed environment.

With reference now to FIG. 4 a more detailed block diagram of a digital implementation of a sorting apparatus embodying the teachings of this invention is shown in the environment of a bichromatic multiplexed sorting apparatus. It is understood that heretofore the sorting apparatus described in the figures as embodying the teachings of this invention are applicable with substantially equal facility to a non-multiplexed digital sorting arrangement. However, the generation of discrete sampling occasions may be conveniently associated in a multiplexed environment with the channel times during which each of the individual viewers are sampled by the multiplexer. The multiplexed sorting apparatus disclosed and claimed in the co-pending application of John D. P. Jones, Miles A. Smither and Elias H. Codding, Ser. No. 704,651, filed July 12, 1976, now U.S. Pat. No. 4,134,498, assigned to the assignee of the present invention discloses functional elements described in connection with several of the remaining figures herein. Where appropriate, reference to the last-referenced patent is made.

As set forth in the last-referenced patent a multiplexed sorting apparatus may conveniently include upper and lower conveyor elements 54A and 54B spaced a predetermined vertical distance 56 apart. An article stream having harvested comestible products, including fully ripe, totally acceptable comestibles, marginally acceptable comestibles or "breakers", unacceptable comestibles, and foreign objects such as dirt clods is deposited upon the upper conveyor 54A. As the randomly disposed article stream reaches the end of the upper conveyor 54A the articles disposed thereon fall by the influence or their weight downwardly toward the lower conveyor 54B. The viewed area 14 includes a predetermined number of side-by-side viewed sectors through which articles in the article stream pass during their free-fall from the upper to the lower conveyor.

The viewer means 12 includes a plurality of individual viewer elements corresponding to the number of individual sectors of the viewed area through which the article stream passes. Each of the viewer elements is assigned a sector. The plurality of viewers are disposed so as to completely emcompass within their field of view the entire viewed area 14. Of course, the viewed area comprised of the plurality of side-by side sectors has a width commensurate with the transverse width of the upper article conveyor 54A. For sorting comestibles as tomatoes, a conveyor width of approximately 22 inches is utilized. It is the practice to assign each of the plurality of viewers 12 a one-inch section of the viewed area 14.

As each of the articles carried on the conveyor pass through at least one of the viewed sectors of the viewed area 14 light energy (provided by an illumination source 58) is reflected from each of the articles. Each of the viewer elements is adapted to collect light energy reflected from an article passing within its assigned sector of the viewed area 14 and generates electrical signals representative of predetermined physical characteristics of the article. In a sorting apparatus relying upon reflected light energy at two predetermined wavelengths, first and second electrical characteristic signals representative of light at red and green wavelengths are generated by characteristic signal generating means 18. The means 18 includes typically first and second photovoltaic cells.

Each of the viewer elements may include an object lens, a defocusing lens, an adjustable optical frame, a beam splitter, and first and second filters located in respective portions of the split beam. Light reflected from an article passing through the viewed sector assigned to a given viewer propagates through the object lens, defocusing lens, and optical frame and is directed to the beam splitter. A portion of the light is split by the beam splitter and passed through the first filter to the first light sensor and the remaining portion of the light passes through thr second filter into the second light sensor. The light sensors, such as the photovoltaic cells, generate electrical characteristic signals representative of the intensity of light at the predetermined wavelength.

In FIG. 4 the reflected light intensity from articles passing through sectors of the viewed area are detected against a black hole region indicated diagrammatically at reference numeral 60. As discussed above, the black hole region is a non-refective background region which does not, and is not utilized to, provide a reference signal against which articles are classified. The viewers 12 are trained at the black hole region conveniently disposed intermediate the upper and lower conveyors 54A and 54B, respectively. Articles ultimately rejected on the basis of their color (ripeness) or their similarity to foreign objects (dirt clods) are ejected from the article stream by the ejector means 32. Any suitable ejector element may be utilized.

It is understood that the recited physical structures above-mentioned are fully set forth in the co-pending application Ser. No. 704,651 of John D. P. Jones, Miles A. Smither and Elias H. Codding, now U.S. Pat. No. 4,134,498, and the co-pending application of James F. Lockett, Ser. No. 704,697, filed July 12, 1976 and assigned to the assignee of the present invention. Those portions of these referenced co-pending applications are hereby incorporated by reference herein.

The signal outputs from each of the light sensors associated with each of the viewers are applied to a time multiplex sampling means 62. The characteristic signal output from each of the viewers 12 are sampled by the multiplexer 62 stepping in response to enabling pulses output from a timing network 64 (distinguished from the clock 48 discussed in connection with FIG. 3). The multiplexer 62 samples the parallel information streams input thereto from the viewer 12 and, since a bichromatic sort is described, two output signal lines 66 and 68 from the multiplexer 62 are input to the classification and comparison means 20. Each of the ejector elements 32 associated with each of the sectors of the viewed area 14 is connected to a demultiplexer 70 stepped in accordance with enabling signals from the timing network 64. It is understood that the multiplexer 62 may be constructed from suitable elements such as those manufactured by Harris Semiconductor under model number HI506A. A demultiplexer 70 is conveniently constructed from a plurality of elements sold under model number 7442 by Texas Instruments.

The timing network 64 utilizes an input signal from which a digital frequency of $2^{-4}$ is generated by the application of the input signal to inverters connected as an oscillator. The frequency of oscillation is variably controllable by a potentiometer. The digital frequency $2^{-4}$ is output to the first of a plurality of cascaded binary counters (such as those designated 74L93 or 74L74, both manufactured by Texas Instruments) which may be utilized within the timing network 64. The cascaded counter arrangement produces a plurality of digital frequencies ranging from $2^{-4}$ to $2^{9}$ which are utilized as timing and enabling pulses throughout the multiplexed sorter apparatus circuitry.

Detail descriptions of the multiplexer 62, timing network work 64 and demultiplexer 70 are provided in the last-referenced co-pending applications Ser. Nos. 704,651 and 704,697, respectively. Those portions of the last-referenced co-pending applications describing the structure and operation of these elements are hereby incorporated by reference.

The output lines 66 and 68 of the multiplexer 62 are connected to the classification and comparison means 20. The classification and comparison means 20 includes a ratio signal generator 74 connected to the lines 66 and 68. The ratio signal output of the generator 74 is connected by a line 76 to a color trip circuit arrangement 78. The color trip circuit generates a color reject signal if the ratio of electrical characteristic signals representative of light reflected from an article within the sector viewed by the viewer currently being sampled by the multiplexer 62 deviates from a reference value representative of an acceptably colored article. The output of the color trip circuit arrangement 78 is carried by a line 80 to the foreign object discriminator 26. The classification and comparison means 20 further includes a summing element 82 connected to the lines 66 and 68 in parallel with ratio signal generator 74. The output of the summing element 82 as well as the output of the ratio signal generator 74 are respectively applied by lines 84 and 85 to a circuit arrangement 86 for generating a dirt trip signal if an electrical signal functionally related to the electrical characteristic signals at the predetermined wavelengths falls within a predetermined range of values representative of the dirt window. The output of the dirt trip circuit arrangement 86 is applied to the foreign object discriminator 26 by a line 88.

The article-detect means 38 is connected to the output lines 66 and 68 from the multiplex sample 62 and generates an article-detect signal representative of the appearance of an article within the sector being viewed by the viewer element 12 currently being sampled. The output of the article-detect means 38 is connected to the foreign object discriminator 26 by a line 92. The detailed circuit configurations of the classification and comparison means 20 and the article-detect means 38 are set forth in FIG. 6.

The foreign object discriminator 26 includes the polling means 42, counting means 44, count comparator 46, and reject signal generating means 30 discussed in connection with FIG. 3. However, since the discriminator 26 is used in connection with a multiplexed sorting arrangement, the channel times during which each of the individual viewer elements are sampled by the multiplexer 62 conveniently correspond to the N discrete occasions in which the characteristic signals from each of the viewers may be polled. Accordingly, digital enabling signals from the timing network 64 are applied to the foreign object discriminator 26 by a line 94. It is to be understood that each of the viewer elements are polled for foreign object discrimination purposes during N consecutive multiplex channel times after the occurrence of an article-detect signal within the sector viewed by the sampled viewer. The occurrence of the article-detect signal also generates a "timing bit" which is stored in a memory location for a reference time interval equal to the number N multiplied by the time necessary for the multiplexer 62 to sample the given channels, step through all other channels, and return to the given channel. (For example, a full 32-channel sweep, including all active viewer channels plus other multiplexed activities is 0.0016 seconds. If $N=8$, the reference time interval is 0.0128 seconds. These parameters are, of course, adjustable.)

The memory and storage functions for the foreign object discriminator 26 are performed by a memory arrangement 96 connected thereto by a line 98. As is set forth more clearly herein, the memory arrangement 96 is associated with the remainder of discriminator arrangement 26 by a line 100 to store color reject, foreign object reject, and timing signals. (Separate memory capability is provided for activities in connection with the loading of the timing signal and count comparison.) To provide the storage capability, two cascaded memory elements are utilized. In the detailed embodiment of the foreign object discriminator according to the invention shown in FIG. 7, one memory element is partitioned into three sections (one each for color, dirt, and timing information, respectively). Storage capacity and delay capability are enhanced by a second cascaded memory element. However, such an arrangement requires memory address means 102, tied to the timing network 64 by a line 94C. Further, as is set forth in more detail on several of the following figures, arrangements for memory read/write enablement and data transfer enablement are also provided. An output line 106 from the memory arrangement 96 may be connected to a delay element 34, if further delay time is desired.

Figure 5:
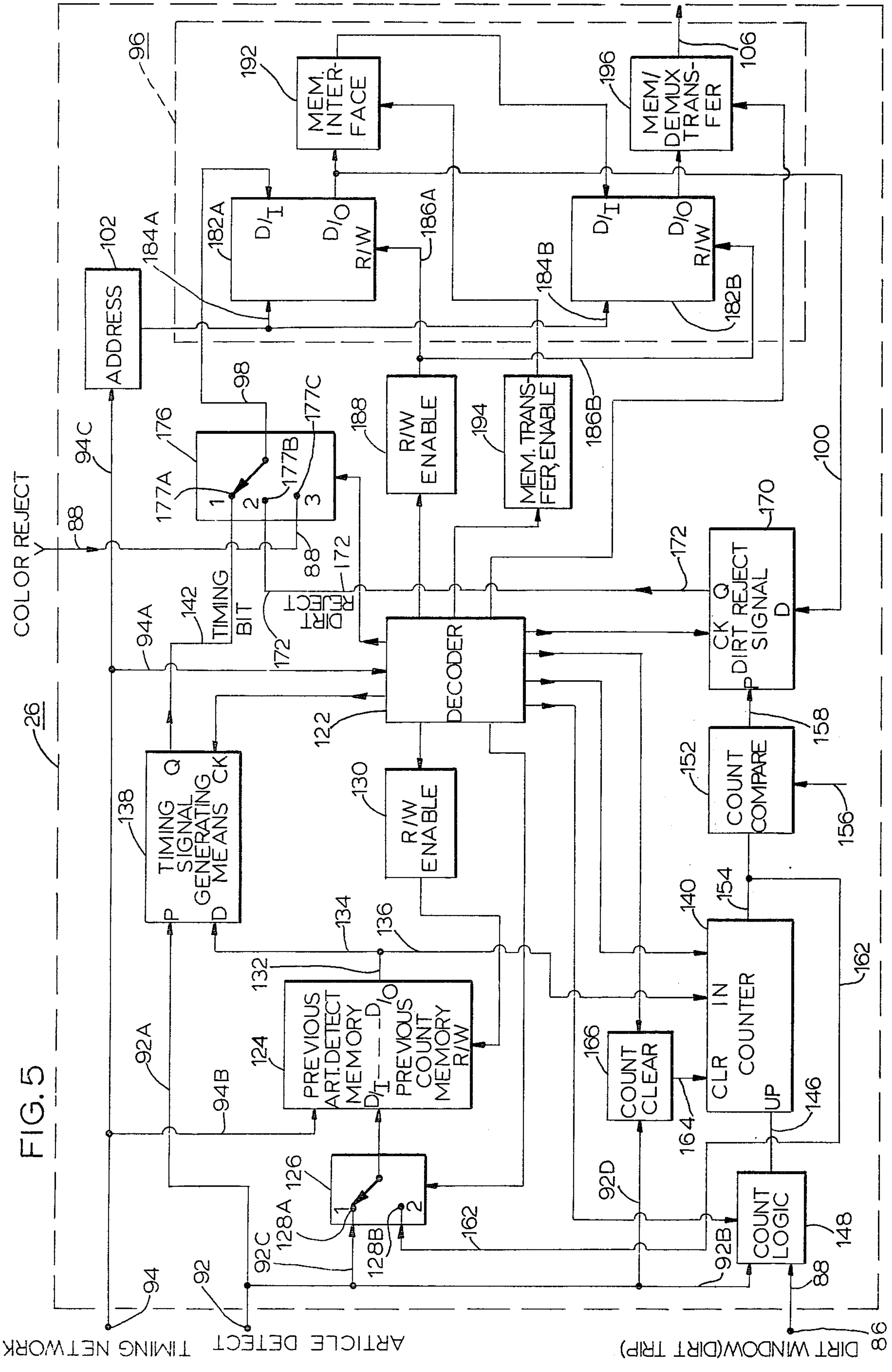
FIG. 5 is a block diagram of a foreign object discriminator used in the digitally implemented sorting apparatus shown in FIG. 4.

With reference to FIG. 5, a detailed block diagram of the foreign object discriminator 26 adapted for use in a multiplexed sorting apparatus and embodying the teachings of this invention is shown. As discussed previously, when the foreign object discriminator is used in connection with a multiplexed sorting apparatus, the channel times during which a given one of the viewers is sampled provide convenient discreate occasions in which to poll the electrical characteristic signals generated by the viewer being sampled. Further, during N successive channel times following the occurrence of an article-detect signal, a count is taken of the instances wherein the characteristic signals fall within the dirt window (that is, generate a "dirt trip") and the count compared to a preset count. Upon the reappearance of a "timing bit" (generated in response to an article-detect signal and stored for the reference time interval) a dirt reject signal is generated if the count equals or exceeds the preset count. The dirt reject signal is stored, along with any color reject signal from the color trip arrangement (FIGS. 4 and 6), in the appropriate sections of a trisectioned memory element. (The remaining memory section stores "timing bit" data.) To enhance the storage capacity of the memory, a second memory element is provided, with appropriate memory/memory interface logic and enablement circuitry being provided. The second memory may be interfaced directly with the demultiplexer through appropriate interface logic and enablement circuitry. All of the circuit elements are block diagrammatically illustrated on FIG. 5.

The enablement of the various functions performed by the foreign object discriminator 26 is ordered by output signals from a binary-to-decimal decoder 122. The decoder 122 receives output signals from the timing network 64 through the line 94A connected to the external line 94 (FIG. 4). Since the operations herein discussed occur within each channel time for each channel, the binary frequencies input to the decoder 122 are greater than the basic multiplex frequency, $2^0$, which defines the channel time for the multiplex sample. The binary frequencies input to the decoder, $2^{-1}$, $2^{-2}$, and $2^{-3}$, are converted to eight decimal outputs and define eight "microcyles" during each multiplex sample time in which various functions are performed. A suitable decoder adapted for use in a foreign object discriminator for a multiplex sorting apparatus is that sold by Texas Instruments, under Model No. 74LS138.

An addressable memory element 124 is connected to the external line 94 (FIG. 4) from the timing network 64 by a line 94B and is input with binary frequencies $2^0$ through $2^4$. A 256×4 bit memory element such as that sold under Model No. 2101P by Intel is useful as the memory 124. The data input to the memory element 124 is connected to a multiplex switch arrangement 126, which is enabled by the decoder 122. In response to the enabling pulses output from the decoder 122, and in accordance with the address locations defined by the line 94B, information present at input terminals 128A and 128B is loaded into the appropriate one of the two memory storage sections into which the memory 124 is partitioned. As is discussed in more detail herein, previous article-detect information and previous count information are stored in the partitioned sections of the memory 124. The read/write terminal of memory 124 is enabled through a logic network 130 connected to the decoder 122. Information read from the data output terminal 132 of the memory 124 is carried by lines 134 and 136 to a timing signal generating means 138 and a counter 140, respectively.

The timing signal generating means 138 is enabled by the decoder 122 and is connected to the external line 92 (FIG. 4) from the article-detect means 38 by a line 92A. The output of the timing signal generating means is carried by a line 142.

The counter 140 is an up-down binary counter such as that sold by Texas Instruments under Model No. 74LS193. The UP terminal of the counter 140 is connected by a line 146 to a count-up logic circuit arrangement 148. The count-up logic circuit 148 is connected with the output signal on the external line 92 (FIG. 4) from the article-detect means 38 by the line 92B and the output from the dirt trip circuit arrangement 86 input on the line 88 (FIG. 4). When enabled by the decoder 122, the count-up logic 148 outputs a signal to increment the counter 140 only if both an article-detect signal on the line 92B and a dirt trip signal on the line 88 are applied thereto. The current count output of the counter 140 is a 4-bit digital signal which is applied to the input of a digital comparator 152 by a connection 154. A digital comparator such as that sold by Texas Instruments under Model No. 74LS185 may be used as the comparator 152. The comparator 152 acts to compare the then-current count supplied from the counter 140 with a predetermined count set into the comparator 152 by external jumper connections 156. An output signal is supplied on the line 158 if the then-current count is equal to or greater than the predetermined preset count supplied to the comparator 152.

The current counter output is also applied to the terminal 128B of the switch 126 by a connection 162. The first terminal 128A of the switch 126 is connected to the article-detect signal output by a line 92C. Thus, when the switch 126 and the enablement circuitry 130 are enabled by the decoder 122, either the then-current count or the then-present article-detect status is loaded into the addressed memory location in the appropriate partitioned section of the memory 124. The counter 140 is cleared through a line connected to a logic arrangement 166. The logic 166 is enabled by the decoder 122 and clears the counter 140 if the status of an aricle-detect signal input on the line 92D indicates that no article is within the sector viewed by the viewer then currently being sampled by the multiplexer 62 (FIG. 4).

Dirt reject signal generating means 170 is connected to the output line 158 of the digital count comparator 152 and to the decoder 122. As is discussed in full detail herein, a dirt reject signal is output on a line 172 if the means 170 is provided at its data input with a timing signal on the line 100 indicative of the fact that at a predetermined time in the past (equal to a predetermined reference time interval) an article-detect signal was generated by the article-detect means and was used to generate a timing bit which was, in turn, loaded into an appropriate memory location for storage. Furthermore, this reject signal will be stored in memory for a delay period (to permit the article associated with it to pass into proximity of the ejector (FIG. 4)) unless the output on the line 158 indicates that the count generated by that article during the reference time interval is less than the preset count, indicative of the fact that the article is not a foreign object. Again, a dirt reject signal is generated at the end of the reference time interval (indicated by the reappearance of the timing bit on the line 100) unless the count comparison indicates the article has not generated a sufficient count (that is, time residency) to be classified as a foreign object.

The decoder 122 is operatively associated with a multiplex switch 176, essentially a single-pole, triple throw switch, which derives its input 177A from the TIMING BIT line 142 (the output from the timing signal generating means 138), its input 177B from the DIRT REJECT line 172 (the output of the dirt reject signal generating means 170) and to input 177C from output line 80 carrying a signal functionally related to the COLOR REJECT signal (the output from the color trip circuit arrangement 78 (FIG. 4)). The output line 98 from the switch 176 is applied to the memory arrangement 96. (See also, FIG. 4.)

The memory arrangement 96 includes first and second memory elements 182A and 182B, respectively, each stepped through their storage arrays in response to address signals from the address means 102. The address means 102 is, as discussed in connection with FIG. 4, connected to the timing network 64 through the line 94C. The read/-write enable terminal of memory elements 182 A is connected through line 184A to a read/write enablement logic network 188, itself associated with the decoder 122. The read/write enable terminal of memory element 182B is connected through line 184B directly to the decoder 122. The memory elements 182 may be 1024×1 bit memory elements such as those sold by Intel under Model No. 2102.

The output line 98 from the multiplexer switch 176 is tied to the data-in terminal of the memory element 182A. In response to read/write enablement signals, and in connection with the address means 102, information concerning the TIMING BIT, DIRT REJECT and COLOR REJECT gated through the multiplex switch 176 is loaded into a memory storage location in one of three storage sections electronically partitioned within the memory element 182A. One-half of the storage area of the memory element 182A is allocated to the storage of COLOR REJECT information, with one-quarter of the storage area being allocated to TIMING BIT and DIRT REJECT information. The data output terminal is connected to the dirt reject signal generating means 170 since, as explained above, the reappearance of a timing bit from its memory storage location is indicative of the end of the reference time interval.

This recited allocation of storage area does not delay an article-reject signal for a time sufficient to permit the article (either an unacceptable product or foreign object) to move into proximity of the ejectors 32 (FIG.4). Accordingly, the memory elements are cascaded with the output terminal of the memory 182A being connected to the input terminal of the element 182B through a memory interface 192. The logic 192 is enabled through a memory transfer enable logic network 194 operatively coupled to the decoder 122. Thus, the action of the read/write enable 188, memory transfer 194, coupled with address signals from the address means 102, serves to transfer color or dirt reject information from the memory 182A to the memory 182B.

The expanded memory capacity afforded by the memory 182B permits storage of a reject signal for a more extended period. The output terminal of the memory element 182B is connected to the demultiplexer 70 (FIG. 4) through an interface network 196 enabled by the decoder 122. Thus, article eject signals may be transferred to the demultiplexer 70 from the output of the second memory element 182B. It is understood, of course, that numerous other memory arrangements may be utilized for both the memory arrangement 96 as well as for the memory 124. The only requisites are the provision of storage locations for previous articledetect information, previous count information, timing bit information, color reject information and dirt reject information. Delay times may be provided by storage register arrangements, as necessary and as appreciated by those skilled in the art. Any arrangements adapted to serve these functional ends is within the contemplation of the invention.

Figure 6:
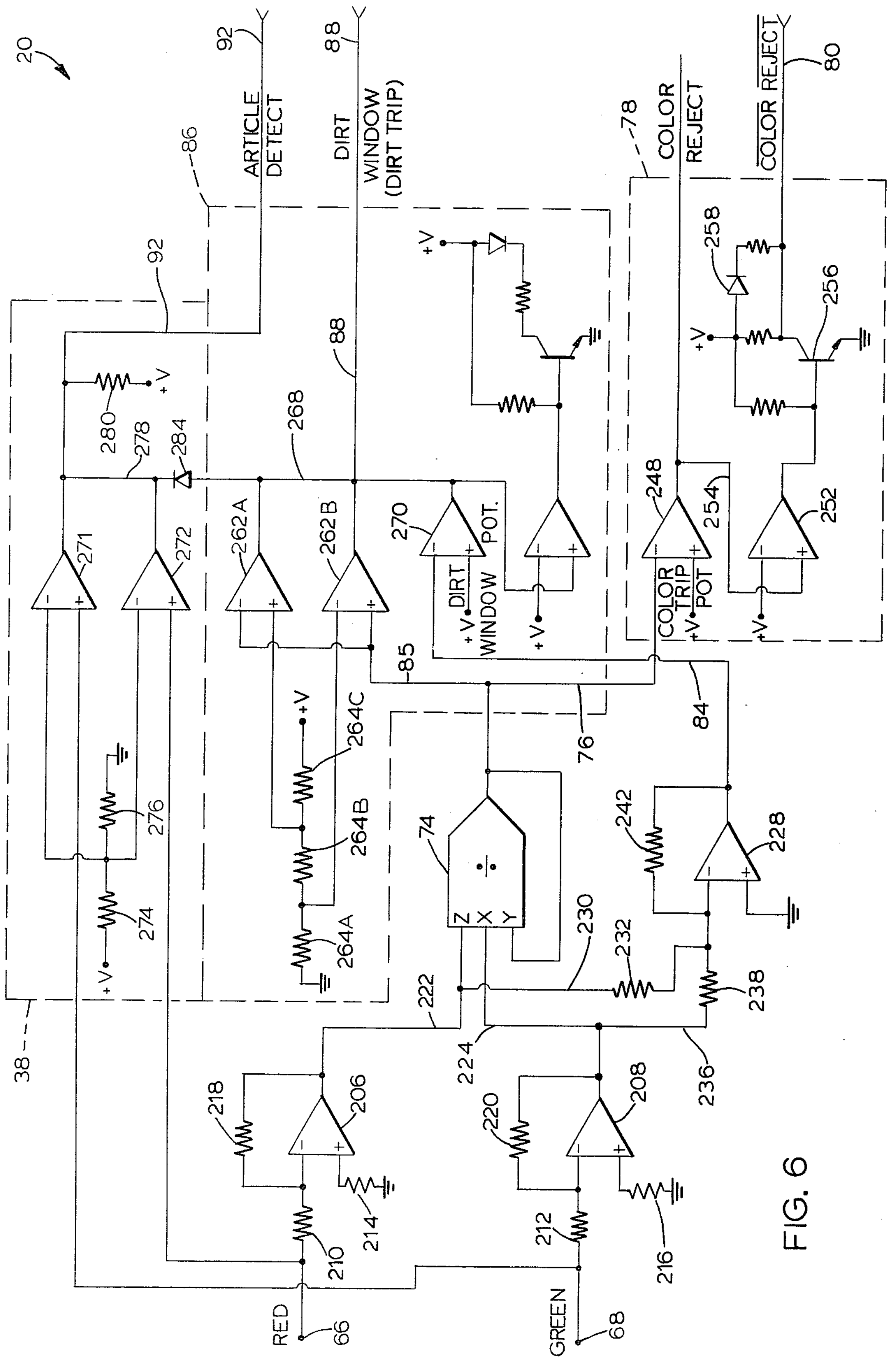
FIG. 6 is a detailed schematic diagram of a classification and comparison means indicated in the block diagrams in FIGS. 4 and 5; and, FIGS. 7A and 7B are detailed schematic diagrams of the foreign object discriminator indicated in the block diagram FIG. 5 in accordance with this invention.
Figure 7A:
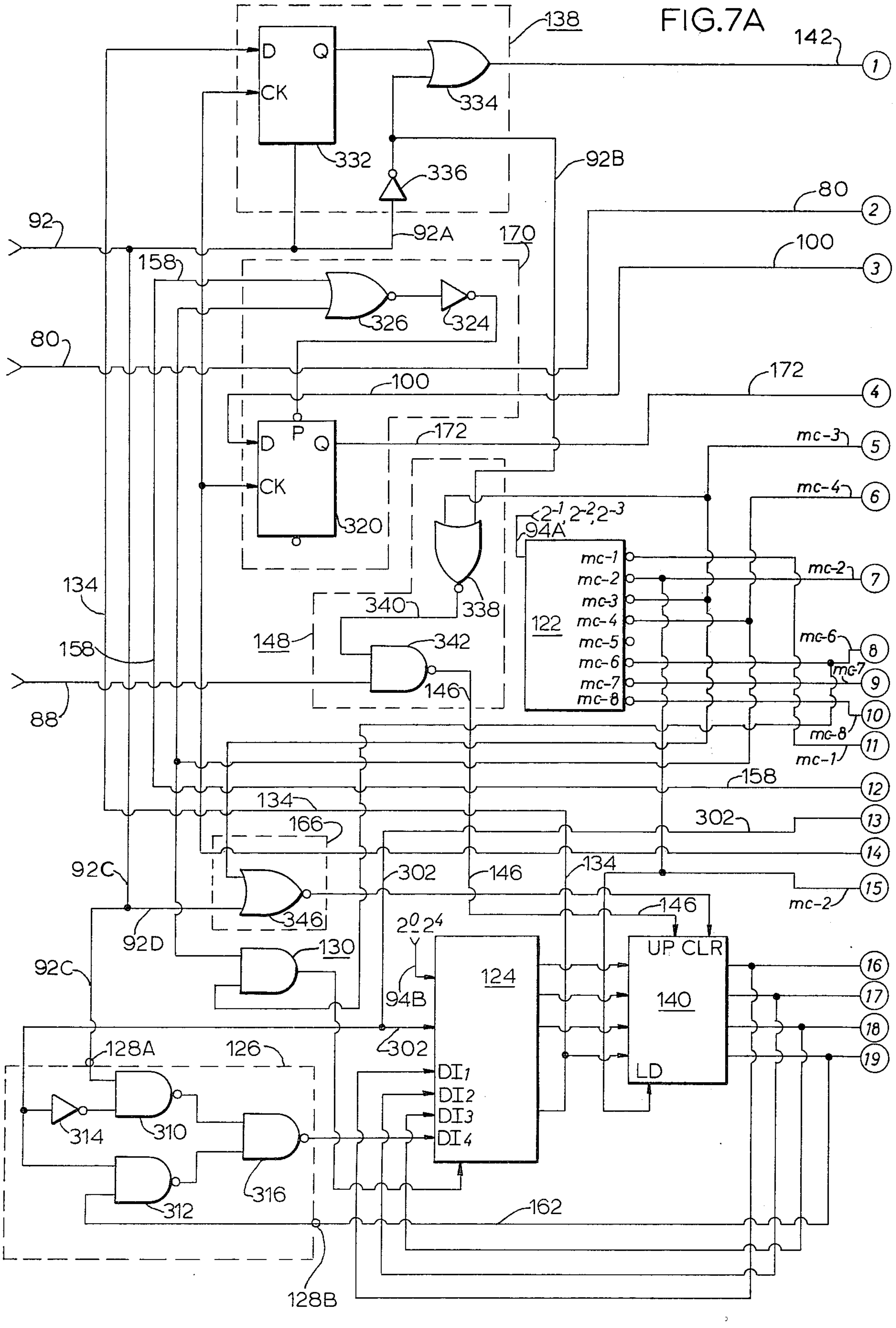
Figure 7B:
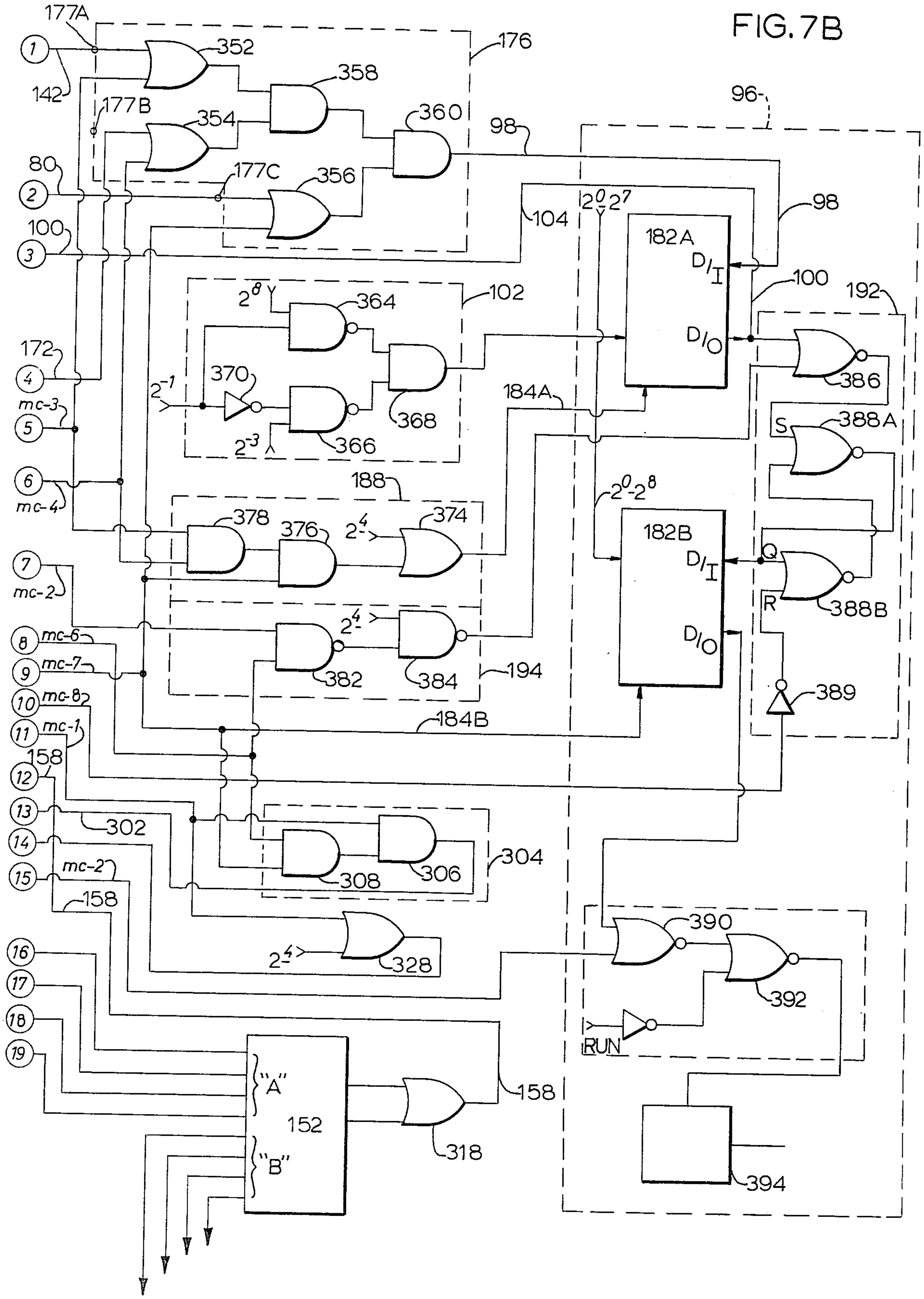

Having described the functional block diagrams and detailed block diagrams of a foreign object discriminator 26 embodying the teachings of this invention, a description of the detailed schematic diagram of the classification and comparison means 20 and of the foreign object discriminator 26 are shown in FIGS. 6 and 7, respectively, in the environment of a multiplexed sorting apparatus.

Referring to FIG. 6, a detailed schematic diagram of the classification and comparison means 20 and the articledetect means 38 is illustrated in connection with the multiplexed sorting apparatus shown block diagramatically in FIG. 4.

In FIG. 6, the input lines 66 and 68 from the multiplex element 62 (FIG. 4) are applied to the inverting inputs of amplifiers 206 and 208 through resistors 210 and 212, respectively. The non-inverting terminals of the amplifiers 206 and 208 are respectively connected to ground potential through resistors 214 and 216. The output of each of the amplifiers is respectively fed back to the inverting inputs thereof through resistors 218 and 220, the magnitude of the resistors 218 and 220 being chosen to appropriately control the gain of the amplifiers 206 and 208. The output of the amplifier 206 and the output of the amplifier 208 are respectively connected to the Z and X inputs of the ratio signal generator 74 by lines 222 and 224. The ratio signal generator 74 may be any suitable divider, such as that manufactured by Analog Devices, Inc. and sold under Model No. AD532H. The output of the divider is fed back to the Y input thereof.

The amplified signal output on the line 222 is applied to the inverting input of a summing amplifier 228 through a line 230 having a resistor 232 disposed therein. Similarly, the output line 224 from the amplifier 208 is connected to the same point by a line 236 having a resistor 238 therein. The output of the summing amplifier 228 is fed back through a resistor 242 to the inverting input thereof, while the non-inverting input is connected to ground potential. The output from the summing amplifier 228 is applied to the output line 84.

The color trip circuit arrangement 78 includes a comparator 248 connected at its inverting input to the output line 76 from the divider 74. The non-inverting input of the comparator 248 is connected to a color trip potentiometer (not shown). The comparator 248 operates to emit a logic high signal (color reject) if the magnitude of the signal applied to the inverting input is less negative than the voltage applied to the non-inverting input from the color trip potentiometer. The output of the comparator 248 is connected to the non-inverting input of a buffer amplifier 252 by a line 254. The inverting input of the comparator 252 is applied to a positive potential. The output of the comparator 252 is applied to the base of an NPN transistor 256. The transistor 256 inverts the output from the buffer amplifier 252 and a signal functionally related to the output of the comparator 248 ($\overline{\text{COLOR REJECT}}$) is output from the collector of the transistor 256 on the line 80 to the foreign object discriminator 26. A light-emitting diode 258 is connected between a positive potential and the collector of the transistor 256.

The dirt trip circuit arrangement 86 includes window comparators 262A and 262B respectively having their inverting and non-inverting inputs connected to the output line 85 from the divider 74. The non-inverting input of the comparator 262A and the inverting input of the comparator 262B are respectively connected to the junctions of resistor elements 264A, 264B and 264C connected in series between a positive potential and ground. The window comparators generate the range of signals between the divergent lines p and q (illustrated on FIG. 1) which define the dirt band. An output signal from the window comparators 262 on the output line 268 thereof is representative of a ratio signal lying within the dirt band.

The dirt trip means 86 further includes a comparator 270 connected at its inverting terminal to the output line 84 from the summing amplifier 228. The non-inverting terminal of the comparator 270 is connected to a dirt window potentiometer (not shown) which defines the adjustable upper limit (FIG. 1) or window intensity which encloses the area of the dirt band between the lines p and q and thereby defines the dirt window. The output line 88 from the dirt trip means 86 is applied to the foreign object discriminator 26.

The article-detect means 38 includes comparators 271 and 272 each having their inverting inputs connected to the junction between resistors 274 and 276, themselves connected in series between a positive potential and ground. The noninverting input of the amplifier 271 is connected to the output line 68 from the multiplexer 62 while the non-inverting input of the comparator 272 is connected to the output line 66 from the multiplexer 62. The outputs of each of the comparators 271 and 272 are connected to the output line 278 into the foreign object discriminator 26. The comparators 271 and 272 generate output signals in response to the appearance of an article (whether acceptable product, unacceptable product, or foreign object) whenever an article passes within the area viewed by the appropriate one of the viewer elements being sampled by the multiplexer 62. As such, the article-detect means 38 defines the lower limit lines $t_R$, $t_G$ illustrated as the lower boundaries of the dirt window. The output line 278 is connected to the foreign object discriminator 26 by the line 92 and applies the article-detect signal thereto. A pull-up resistor 280 is connected to the output line 278 of the comparators 270 and 272. The output 278 of the article-detect means 38 and the output 268 of the dirt trip means 86 are coupled together in a logic AND configuration by the provision of a diode 284.

Referring to FIG. 7, a detailed schematic diagram of the foreign object discriminator 26 shown in block diagram form in FIG. 5 is illustrated. The decoder 122 is input with binary frequencies $2^{-1}$, $2^{-2}$ and $2^{-3}$ of higher frequency than the basic multiplex channel frequency $2^0$. The decoder 122 outputs a sequential series of eight pulses which define eight "microcycles" during the channel time for each multiplex channel. The negative-going edges of the pulses output from the decoder 122 trigger various activities discussed in connection with FIG. 5. For convenience, the output lines from the decoder 122 are denoted by the notation "mc-1" through "mc-8". Depending upon the polarity of the frequency $2^{-1}$, the first four microcycles ($2^{-1}$ logic low) define a "dirt mode" wherein classification of an article as a foreign object occurs. The remaining four microcycles ($2^{-1}$ logic high) define the "color mode", wherein activities related to color classification are carried out.

The address terminals $A_0$ through $A_4$ of the memory 124 are addressed with binary frequencies $2^0$ through $2^4$ by the bus line 94B. The address terminal $A_7$ is connected by a line 302 to the output of a three-input logic gate arrangement 304, (see FIG. 7B) comprised of AND gates 306 and 308. The first input of the AND gate 306 is connected to the mc-1 output line from the decoder 122. The second input of the gate 306 is taken from the output of the gate 308 which derives inputs at the first and second terminals thereof from the decoder output lines mc-6 and mc-7, respectively. The output line 302 of the gate arrangement 304 goes to a logic low state during the first, sixth and seventh microcycles. The low signal input to the address terminal $A_7$ in conjunction with the address pulses from the bus line 94B serves to electronically partition the memory 124 into storage areas allocated to previous article-detect information and previous count information.

The output line 302 is also applied to the multiplex switch 126 comprised of parallel NAND gates 310 and 312. The enabling pulses on the line 302 are applied to the second input of the gate 310 through an inverter 314 and to the first input of the gate 312. The outputs of the gates 310 and 312 are respectively input to the first and second terminals of a NAND gate 316. The output of the gate 316 is connected to the data input pin $DI_4$ of the memory 124, with the other input pins being connected to the first three outputs of the counter 140. The fourth output of the counter 140 is applied to the second terminal 128B of the switch 126 (the second input of the NAND gate 312) by the line 162 while the first terminal 128A of the switch 126 (the first input of the NAND gate 310) is tied to the output of the article-detect network by the line 92C. The read/write enable 130 for the memory 124 is applied with enabling pulses at its first and second terminals from the decoder output lines mc-4 and mc-6, respectively. The output line from the read/write enable 130 goes to a logic low state during the fourth and sixth microcycles.

The output terminals of the memory 124 are applied to the input terminals of the counter 140. The fourth output terminal of the memory 124 (carrying previous article-detect information) is also applied to the timing signal generating means 138 by the line 134. The load terminal of the counter 140 is enabled by the output line mc-2 from the decoder 122. The counter outputs are also applied to the "A" inputs of the count comparator 152. The "B" inputs of the count comparator 152 are connected to external jumpers whereby the predetermined count is set into the count comparator 152. As is discussed in detail herein, if the count currently output from the counter 140 either equals or exceeds the predetermined count jumpered into the count comparator 152, an output signal from an OR gate 318 is applied by the line 158 to the dirt reject signal generating means 170.

The dirt reject signal generating means 170 includes a quad-D flip-flop 320, such as that sold by Texas Instruments under Model No. 74LS74. The data input of the flip-flop 320 is connected to the data output terminal of the memory element 182A by the line 100. The Q terminal of the flip-flop 320 serves as the output of the dirt reject signal generating means 170 and is connected by the line 172 to the second input terminal 177B of the multiplex switch 176. The preset terminal of the flip-flop 320 is connected through an inverter 324 to the output of a NOR gate 326. The first input of the gate 326 is connected to the line 158 from the OR gate 318 at the outputs of the count comparator 152 while the second input is tied to the output line mc-4 from the decoder 122. The clock input terminal of the flip-flop 320 is enabled from the output of an OR gate 328 connected at its first input to the decoder output line mc-1 and at its second input to binary frequency $2^{-4}$. If a timing bit is clocked into the flip-flop 320, a dirt reject signal at the Q output is loaded into memory through the multiplex switch 176 unless a proper signal is applied to the preset terminal. Such a proper signal is applied as long as the current count is less than the preset count. However, if the current count equals or exceeds the preset count, the signal applied on the line 158 to the gate 326 changes the state of the signal applied to the preset terminal of the flip-flop 320, thus permitting the dirt reject signal to be loaded into the memory 182A.

The output of the OR gate 328 is also applied to the input of a quad-D flip-flop 332 included within the timing signal generating means 138. The data input terminal of the flip-flop 332 is connected to the fourth data output (previous article-detect information) from the memory 124 by the line 134. The Q output of the flip-flop 332 is applied to the first input of an OR gate 334 also included within the means 138. The second input of the gate 334 is derived through an inverter 336 from the article-detect means 38 through the line 92A. The output line 142 of the timing signal generating means 138 is applied to the first terminal 177A of the multiplex switch 176.

The count logic 148 includes a NOR gate 338 which derives its first input from the inverted article-detect signal taken from the output of the inverter 336 by the line 92B. The second input to the NOR gate 338 is tied to the output line mc-3 from the decoder 122. The output line 340 from the gate 338 is connected to the first input terminal of a NAND gate 342. The second input to the gate 342 is supplied by the line 88 from the dirt trip arrangement. The output line 146 from the count logic 148 increments the counter 140 only if an article-detect signal and a dirt trip signal are contemporaneously present during any given channel time during which a given viewer is sampled. The count clear means 166 includes a NOR gate 346 connected at its second input to the line 92D from the article-detect means. The gate 346 is enabled during the third microcycle by the connection of the first terminal to the output line mc-3 from the decoder 122.

The multiplex switch 176 includes OR gates 352, 354 and 356, and AND gates 358 and 360. The output line 98 from the multiplex switch 176 connects the output of the AND gate 360 to the data input terminal of the memory 182A. The first input of the gate 360 is derived from the output of the AND gate 358, while the second input of the gate 360 is taken from the output of the OR gate 356. With respect to the AND gate 358, the first and second inputs thereof are respectively derived from the output of the OR gates 352 and 354. The first terminal of the OR gate 352 acts as the first terminal 177A of the switch 176 and is connected to the line 142 from the output of the timing signal generating means 138. The second input to the OR gate 352 is derived from the line mc-3 from the decoder 122. The first terminal of the OR gate 354 acts as the second terminal 177B of the switch 176 and thus derives its input from the output line 172 from the dirt reject signal generating means 170. The second input to the gate 354 is derived from the output line mc-4 from the decoder 122. The first input of the OR gate 356 acts as the third terminal 177C of the switch 176 and is connected to the output line 80 from the color trip circuit arrangement 78 and is supplied with a signal functionally related to the COLOR REJECT signal output from the comparator 248 (FIG. 6). The second input of the gate 356 is taken from the output line mc-7 from the decoder 122. As may be appreciated from the foregoing by those skilled in the art, timing signal information, dirt reject information and color trip information is gated through the multiplex switch 176 to the data input of the memory element 182A on the third, fourth and seventh microcycles, respectively.

The memory elements 182A and 182B are each input with the binary frequencies $2^0$ through $2^7$ on the address terminal $A_0$ through $A_7$. The address terminal $A_8$ of the memory element 182B is connected to the binary frequency $2^8$ while the address terminal $A_8$ of the element 182A is connected to the output line from the memory address means 102. The means 102 includes parallel NAND gates 364 and 366, the outputs of which are respectively connected to the first and second inputs of the AND gate 368. The first input of the gate 364 is connected to the binary frequency $2^8$ while the second input thereof is tied to binary frequency $2^{-1}$. The binary frequency $2^{-1}$ is input to the first input of the gate 366 through an inverter 370 while the second input is derived from the binary frequency $2^{-3}$. The memory address means 102, in cooperation with the address lines connected to the memory elements 182, serves to electronically partition the memory element 182A into three segmented storage areas allocated to the information gated through the switch 176.

The read/write terminals of the memory elements 182A and 182B are enabled through the decoder 122. The read/write pin of the element 182B is directly connected to the output line mc-7 from the decoder 122 by the line 184B. The read/write pin of the memory element 182A is connected by the line 184A to a read/write enable network 188 including an OR gate 374 and AND gates 376 and 378. The AND gate 378 is connected with the output lines mc-3 and mc-4 from the decoder 122 at the first and second inputs, respectively. The first input to the AND gate 376 is derived from the output of the gate 378, while the second input is derived from the output line mc-7 from the decoder 122. The output of the gate 376 is applied to the second input of the OR gate 374, the first input of which is connected to the binary frequency $2^{-4}$. The read/write enable network 188 thus acts to enable the memory element 182A to write into the appropriately addressed storage location information gated through the multiplex switch 176 during the third, fourth and seventh microcycles.

Information is transferred from the first to the second memory element through the memory interface arrangement 192 enabled by the memory transfer logic 194 associated with the decoder 122. The memory transfer logic 194 includes NAND gates 382 and 384 connected with the inputs to the gate 382 being supplied from the output lines mc-2 and mc-6 from the decoder 122. The first input to the gate 384 is supplied by the binary frequency $2^{-4}$, while the second input is taken from the output of the gate 382. The memory interface 192 includes a NOR gate 386 connected at its first input to the data output terminal of the memory element 182A and at its second input to the output of the gate 384. The output of the NOR gate 386 is applied to the SET terminal of cross-coupled NOR gates 388A and 388B arranged as a SET-RESET flip-flop. The data input to the second memory element 182B is taken from the Q output of the flip-flop. The RESET of the flip-flop is connected through an inverter 389 to the output line mc-8 from the decoder 122.

The data output terminal of the second memory element 182B is interfaced with the demultiplexer 70 (FIG. 4) through the interface arrangement 196 comprising NOR gates 390 and 392. The first input of the NOR gate 390 is connected to the data output of the memory 182B, while the second input is derived from the output line mc-2 from the decoder 122. The first input of the gate 392 is derived from the output of the gate 390, with the output of the gate 392 being connected directly to a decoder/demultiplexer element 394 such as that sold by Texas Instruments under Model No. 74LS139 which is included within the demultiplexer 70. The second input to the gate 392 is connected through an inverter to a RUN signal input from the multiplexer test circuitry. In this regard, it is noted that much of the peripheral functional circuitry provided for the multiplexer sorting apparatus although not set forth herein is disclosed in the Jones et al. Patent as well as in the copending application of James F. Lockett, Ser. No. 704,697, filed July 12, 1976, assigned to the assignee of the present invention. It is understood that such peripheral circuitry is applicable to a multiplexed sorting apparatus involving the foreign oject discrimination of the invention here disclosed and claimed.

Having described functional block diagrams as well as detailed schematic diagrams of a foreign object discriminator in accordance with the invention, the following is a discussion of the operational sequence for a given multiplex channel (hereinafter, channel "X") in accordance with the instant invention. It is noted that the sequence of operations which occurs during each multiplex time while each viewer element is sampled is controlled by the application of output pulses from the decoder 122 to the various functional elements described in connection with FIGS. 5 and 7. It is, of course, understood that the operations detailed herein may be implemented by a microprocessor, a programmable processor or other suitable element and remain within the contemplation of this invention. During the discussion that follows it is assumed that a dirt clod is just coming into the sector viewed by the viewer element sampled by the multiplexer during the channel time (channel "X") under consideration. It is also assumed for purposes of the following discussion that there is no article in view of the viewer associated with channel "X" during the preceding eight channel times in which the output of the viewer accociated with channel "X" was sampled. As discussed above, it is convenient to utilize eight discrete channel samples as the discrete occasions (N=8) in which foreign object discrimination on the basis of digitally measured time residency within the dirt window (FIG. 1) is made. Therefore, it is assumed for purposes of this discussion that a spacing exists between articles in the stream passing through the viewer under discussion so that the black hole region is in view during eight channel times immediately previous to the entry of the dirt clod into the viewed sector assigned to the viewer associated with channel "X".

Therefore, during the first scan through multiplex channel "X", the output of the decoder 122 on the line mc-1 goes low indicative of the addressing of the channel by the multiplexer and the section of the "clod mode" portion of operation. This mode is selected by the state of binary frequency $2^{-1}$ input to the decoder 122 going to a logic low condition. During the first microcycle of the first scan, the memory address location in the memory element 182A is addressed and timing bit information is read from the memory element and is output on the line 100 and applied to the data input of the flip-flop 320 included within the dirt reject signal generating means 170. As will be seen, a timing bit is functionally related to the presence of an article-detect signal during the multiplex channel time eight scans previous. Since, under the hypothetical situation here assumed, there is no article within the viewed sector assigned to multiplex channel "X" the eight scans previous, there is no timing bit loaded into memory location in the memory element 182A corresponding to multiplex channel "X". Since the memory element 182A is an active low element and since under the hypothetical here posited no timing signal information is loaded into that location, a logic high signal is input to the data input of the flip-flop 320. Also, during the first microcycle, previous article-detect information stored within the memory 124 is applied by the line 134 to the data input of the flip-flop 332 included within the timing signal generating means 138. Both the flip-flops 320 and 332 are enabled by output signals from the OR-gate 328.

During the second microcycle of the first scan of multiplex channel "X" in response to enabling signals output on the decoder line mc-2, previous count information also stored within the memory element 124 is loaded into the counter 140. Further, a reject signal (either color or dirt reject) which may previously have been stored within the memory element 182B is read from the memory element through the enablement of the memory multiplex interface 196 due to its connection to the NOR-gate 390 and the decoder output line mc-2.

Under the hypothetical situation here involved, during the third microcycle of the immediately-preceding scan of channel "X" (wherein the viewer viewed the black hole), the article-detect signal input to the foreign object discriminator on the line 92 is in a logic low condition indicative of no article being present within the viewed sector assigned to the viewer associated with channel "X". Thus, during third microcycle of that preceding scan, such a condition (article-detect being a logic low) resulted in the counter being cleared by an output signal on the line 164 from the NOR-gate 346 applied with the article-detect information on the line 92D and enabled by the decoder output line mc-3. However, in the third microcycle of the multiplex scan under discussion, since an article is by hypothesis within the sector viewed by viewer "X", then an article-detect signal from the article-detect means 38 on the line 92A is input to the timing signal generating means 138. This logic high signal on the line 92A is inverted by the inverter 336 and specifically applied to the second input of the OR-gate 334. Simultaneously, the output of the inverter 336 (functionally related to the occurrence of an output signal from the article-detect means) is input on the line 92B to the count logic 148, specifically to the first input of NOR-gate 338. The second input to the NOR-gate 338 is enabled by the decoder output line mc-3 and the output of the gate 338 is connected by the line 340 to the first input of the NAND-gate 342. The second input of the NAND-gate 342 is derived from the line 88 from the output of the dirt trip signal generating means. Thus, if the output of the article-detect means is a logic high indicative of the presence of an article within the viewed sector, and if the dirt trip signal is also high (representative of the fact that the dirt clod is reflecting intensities which fall within the dirt window (see FIG. 1)), then an output signal on the line 146 increments the counter 140. Furthermore, also during the third microcycle of the first scan, if the previous article-detect state latched into the flip-flop 332 of the timing signal generating means is a logic low (indicating that no article is in view during the previous scan through the viewer), then an output signal from the OR-gate 334 on the line 142 is input through the first terminal of the OR-gate 352. The second terminal of the OR-gate 352 is enabled by the output line mc-3 from the decoder 122. Thus, a logic low signal representative of a timing bit, generated by the timing signal generating means (generated in response to the presence of an article-detect signal during the current scan and the absence of an article-detect signal during the previous scan) is loaded into the then-appropriately addressed memory location.

During the fourth microcycle of the first scan, an enabling signal from the decoder output line mc-4 is input through the read/write enable means 130 to enable the memory 124 to write into the appropriately addressed location the count appearing at the output of the counter 140 and being gated into the memory 124 through the action of the multiplex switch 126. Also, during the fourth microcycle of the first scan, a count comparison is made between the preset count jumpered into the count comparator 152 and the current count output from the counter 140. If the current count is greater than or equal to the preset count, the OR-gate 318 outputs a terminal on the line 158 to the first terminal of NOR-gate 326 (the second terminal being enabled by the output line mc-4). The output of the NOR-gate 326 is taken through the inverter 324 and applied to the present terminal of the flip-flop 320 to set the Q output thereof to a logic-one state. However, it is noted that since no timing signal is loaded into the flip-flop 320 during the first microcycle (that is, a logic one was read from memory), a logic one is already present at the Q output on the line 172 leading to the second terminal of the multiplex switch 176 (specifically, the first terminal of the OR-gate 354). The second terminal of the OR-gate 354 is enabled by the decoder output line mc-4. Thus, during the fourth microcycle, if a dirt reject signal (a logic low) is present at the Q output of the flip-flop 320, it is loaded into the then-appropriately addressed memory location within the memory element 182A.

The change of polarity of binary frequency $2^{-1}$ to a logic high signal occurs during the fifth microcycle and indicates the selection of the "color" mode. During the sixth microcycle, the decoder output line mc-6 enables the multiplex switch 126 through the logic arrangement 304 and the write enable means 130 so that the present article-detect status is loaded into the appropriately addressed memory location of the memory 124. Also during the sixth microcycle, color reject information previously loaded into the appropriately addressed location within the section of the memory element 182A relating to color reject information is loaded into the appropriately addressed location in the second memory element 182B by the enablement of the write terminal of the memory 182B. During the seventh microcycle, the present color reject information is applied to the third terminal of the multiplex switch 176 (specifically to the first input of the OR-gate 356). The OR-gate 356 is enabled by the decoder output line mc-7 and loaded into the then-appropriately addressed memory location. No operation of the system occurs during the eighth microcycle.

A predetermined period of time later, equal to the scan time of the multiplexer, channel "X" again comes up and the operations which occur during each of the microcycles and which are described in connection with the first scan are repeated. Differences, of course, exist in that during the first microcycle of the second scan, the previous article-detect status loaded into the memory 124 (during the sixth microcycle of the first scan) indicates that during the immediately preceding scan (i.e., the first scan of channel "X") an article was then within the viewed sector of the viewer being sampled and thus, the article-detect signal was then a logic high signal. Thus, during the third microcycle of the second scan, a signal indicating the absence of a request for a timing bit is loaded into the memory location (since there is no absence of an article-detect signal during the previous scan). Also, during the third microcycle of the first scan, since the article-detect information was not a logic low (that is, it was a logic high), the counter was not cleared. Thus, during the third microcycle of the second scan, since the article-detect information is a logic high and since the reflectivity characteristic of the dirt clod lies within the dirt window, a signal from the count logic 148 is output on the line 146 to increment the counter from the previous count (a "one") to the current count (a "two"). During the fourth microcycle of the second scan, a count comparison between the current count (now a "two") and the preset jumpered count is made. It has been observed that a count of "four" is a suitable preset count against which current count comparisons are made. A count of four digitally represents the time-residency of a signal within the dirt window for an amount of time sufficient to identify the article as a dirt clod rather than a breaker tomato. Since the current count does not equal or exceed the preset count, a logic one is applied to the preset terminal of the flip-flop 320. However, since during the first microcycle of the second scan no timing bit was read from the memory 182A, a logic high is already present at the Q output of the flip-flop 320 and applied to the second terminal of the multiplex switch 176. During the sixth microcycle of the second scan, the then-present article-detect status is loaded into the memory 124. The third scan is identical to the second scan, with only the count incrementing from "two" to "three".

On the fourth scan, since the article within the viewed sector of channel "X" is a dirt clod, during the third microcycle, the counter is incremented from the previous count (a "three") to a current count of "four". During the fourth microcycle of the fourth scan, a comparison of the then-current count (a "four") with the preset jumpered count (a "four") generates an output signal from the count comparator 152. This occurrence generates an output signal from the OR-gate 318 on the line 158 which is applied to the preset pin of the flip-flop 320. Thus, a logic high signal is applied to the preset pin. Thus whatever signal is loaded into the data input of the flip-flop 320 during the first microcycle of the fourth scan is taken from the Q output through the line 172 to the multiplex switch 176. However, during the first microcycle of the fourth scan no timing bit is read from the memory location. Accordingly, a logic one is applied at the Q output. But note, the logic one appears not through the presence of a signal at the preset pin of the flip-flop 320, but because of the signal read from the memory. The fifth, sixth and seventh scans, aside from counter incrementing, are identical to the fourth scan.

During the eighth scan of the viewer channel "X" and during the first microcycle thereof, the timing bit loaded into memory element 182A during the first microcycle of the first scan is read therefrom. The logic low state read from the addressed memory location is applied to the data input terminal of the flip-flop 320 by the line 100. Since the current count (now, as "eight") exceeds the preset count, on the third microcycle of the eighth scan, an output signal from the count comparator 152 results in a logic high signal being applied to the preset pin of the flip-flop 320. Accordingly, during the fourth microcycle of the eighth scan, the timing bit (a logic low signal) is applied by the Q output of the flip-flop 320 on the line 172. On the fourth microcycle of the eighth scan, the logic low signal—indicative of a dirt reject—is gated through the multiplex switch 176 into the then-appropriately addressed memory location.

If, for the purposes of illustration, a breaker tomato were assumed to be within the view of the viewer associated with channel "X", because of the trace path (FIG. 1) of such an article, on the eighth scan the counter 140 would record a count less than the preset jumpered count. Thus, the digital representation of the time residency of the characteristic signal of the breaker tomato is less than the predetermined time residency of a foreign object. Accordingly, no output from the comparator 152 would occur, and a signal is applied to the preset terminal of the flip-flop 320 so that a logic zero is applied to the multiplex switch 176 during the fourth microcycle of the eighth scan despite a timing bit having been read from the memory location during the first microcycle. So, although reading a timing bit from memory would ordinarily result in a logic low signal being applied to the flip-flop 320, the presence of a signal on the preset pin "rescues" the classification of a breaker tomato as a dirt clod or other foreign object.

Having thus described a preferred embodiment of the invention, those skilled in the art may effect numerous modifications thereto in view of the description hereinbefore set fourth. These modifications are understood to lie within the scope of this invention as defined in the appended claims.

What is claimed is:

1. Apparatus for sorting articles randomly disposed in an article stream comprising:

viewer means for viewing a predetermined area through which an article stream is passed and for generating an electrical characteristic signal functionally related to the presence of a predetermined physical characteristic in an article passing within a viewed area;

classification means for classifying the article on the basis of a comparison between the magnitude of the electrical characteristic signal and a predetermined range of signal values;

timing means for measuring the amount of time during a reference time interval that the electrical characteristic signal falls within the predetermined range of signal values; and, reject signal generating means for generating an electrical article-reject signal if the amount of time during which the electrical characteristic signal falls within the range of signal values exceeds a predetermined time reference criteria.

2. The sorting apparatus of claim 1 further comprising article-detect means associated with the viewer means for generating an electrical article-detect signal representative of the presence of an article within the viewed area, the article-detect means being operatively associated with the timing means such that the predetermined reference time interval is measured from the occurrence of the electrical article-detect signal.

3. A sorting apparatus for sorting articles randomly disposed across an article stream comprising:

viewer means for viewing a predetermined area through which an article stream is passed and for generating an electrical characteristic signal functionally related to the presence of a predetermined physical characteristic in an article passing within the viewed area;

classification means for generating a classification signal on the basis of a comparison between the magnitude of the electrical characteristic signal and a predetermined range of signal values;

means for polling the classification means a predetermined number of discrete occasions N within a predetermined time interval initiated upon article detection;

counter means associated with the polling means for counting the number of occurrences of the classification signal; and reject signal generating means for generating an electrical article-reject signal if the count recorded by the counter means exceeds a predetermined reference count.

4. The sorting apparatus of claim 3 further comprising article-detect means associated with the viewer means for generating an electrical article-detect signal representative of the presence of an article within the viewed area, the article-detect means being operatively associated with the counter means such that the counter means may be incremented only in the event an article-detect signal is generated by the article-detect means.

5. A sorting apparatus for sorting articles randomly disposed across an article stream comprising:

a plurality of viewer elements each viewing a predetermined sector through which an article is passed and for generating an electrical characteristic signal functionally related to the presence of a predetermined physical characteristic of an article passing within the viewed sector associated with each viewer element;

means for sampling the outputs of each viewer element a predetermined number of discrete occasions N;

classification means for classifying an article on the basis of a comparison of the sampled output of each viewer and a predetermined range of signal values representative of a foreign object;

a foreign object discriminator sequenced in coordination with the sampling means for polling the classification and comparison means, said discriminator including a counter for counting the number of instances that the electrical characteristic signal of each viewer element falls within the predetermined range of values, the discriminator also including reject signal generating means for generating an article-reject signal if the count exceeds a predetermined reference count.

6. The sorting apparatus of claim 5 further comprising article-detect means associated with the viewer means for generating an electrical article-detect signal representative of the presence of an article within the viewed area, the article-detect means being operatively associated with the counter means such that the counter may be incremented only in the event an article-detect signal is generated by the article-detect means.

* * * * *

UNITED STATES PATENT AND TRADEMARK OFFICE
CERTIFICATE OF CORRECTION

PATENT NO. : 4,260,062
DATED : April 7, 1981
INVENTOR(S) : James F. Lockett

It is certified that error appears in the above-identified patent and that said Letters Patent are hereby corrected as shown below:

Col. 14, Line 46 - "triple throw" should read -- triple-throw --.
Col. 14, Line 51 - "to" should read -- its --.
Col. 14, Line 63 - "read/-write" should read -- read/write --.
Col. 20, Line 68 - "Patent" should read -- patent --; "copending" should read -- co-pending --.

Signed and Sealed this

*Thirteenth* Day of *October 1981*

[SEAL]

*Attest:*

GERALD J. MOSSINGHOFF

*Attesting Officer* *Commissioner of Patents and Trademarks*